(12) United States Patent
Suh et al.

(10) Patent No.: US 8,752,109 B2
(45) Date of Patent: *Jun. 10, 2014

(54) METHOD FOR RECEIVING A BROADCAST SIGNAL AND BROADCAST RECEIVER

(71) Applicant: LG Electronics Inc., Seoul (KR)

(72) Inventors: Jong Yeul Suh, Seoul (KR); Gomer Thomas, Arlington, WA (US); Jae Hyung Song, Seoul (KR); Jin Pil Kim, Seoul (KR); Ho Teak Hong, Seoul (KR); Joon Hui Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/051,944

(22) Filed: Oct. 11, 2013

(65) Prior Publication Data

US 2014/0109160 A1     Apr. 17, 2014

Related U.S. Application Data

(63) Continuation of application No. 13/591,829, filed on Aug. 22, 2012, now Pat. No. 8,572,664, which is a continuation of application No. 12/591,416, filed on Nov. 18, 2009, now Pat. No. 8,272,022.

(60) Provisional application No. 61/115,888, filed on Nov. 18, 2008, provisional application No. 61/121,178, filed on Dec. 9, 2008, provisional application No. 61/138,494, filed on Dec. 17, 2008, provisional application No. 61/153,973, filed on Feb. 20, 2009, provisional application No. 61/153,985, filed on Feb. 20, 2009, provisional application No. 61/169,711, filed on Apr. 15, 2009, provisional application No. 61/179,005, filed on May 17, 2009, provisional application No. 61/179,343, filed on May 18, 2009.

(51) Int. Cl.
*H04N 7/173* (2011.01)

(52) U.S. Cl.
USPC .................. 725/109; 725/45; 725/50; 725/51

(58) Field of Classification Search
None
See application file for complete search history.

(56) References Cited

U.S. PATENT DOCUMENTS

| | | |
|---|---|---|
| 8,099,752 B2 | 1/2012 | Eyer |
| 2003/0196204 A1 | 10/2003 | Thiagarajan et al. |
| 2004/0160943 A1 | 8/2004 | Cain |
| 2006/0193337 A1 | 8/2006 | Paila et al. |
| 2008/0040666 A1 | 2/2008 | Wang et al. |
| 2009/0138932 A1 | 5/2009 | Bauchot et al. |
| 2010/0095328 A1 | 4/2010 | Hartung et al. |
| 2010/0134701 A1 | 6/2010 | Eyer |
| 2010/0299702 A1 | 11/2010 | Lo et al. |

FOREIGN PATENT DOCUMENTS

| | | |
|---|---|---|
| WO | 2007/072138 A2 | 6/2007 |
| WO | 2007/086704 A1 | 8/2007 |

*Primary Examiner* — Jason J Chung
(74) *Attorney, Agent, or Firm* — McKenna Long & Aldridge LLP

(57) ABSTRACT

A method of receiving a broadcast signal including a Non-Real-Time (NRT) service and a broadcast receiver are disclosed herein. A method of receiving a broadcast signal including an NRT service, method comprises receiving a broadcast signal including first signaling information and second signaling information, identifying the NRT service based on the first signaling information, identifying an Internet Protocol (IP) address of an NRT service signaling data based on the first signaling information and the second signaling information, receiving the NRT service signaling data by accessing the IP address, and downloading a desired NRT service based on the NRT service signaling data.

1 Claim, 21 Drawing Sheets

FIG. 5

| service_type | Meaning |
|---|---|
| 0x00 | [Reserved] |
| 0x01 | Analog_television - The virtual channel carries analog television programming |
| 0x02 | ATSC_digital_television - The virtual channel carries television programming (audio, video and optional associated data) conforming to ATSC standards |
| 0x03 | ATSC_audio - The virtual channel carries audio programming (audio service and optional associated data) conforming to ATSC standards |
| 0x04 | ATSC_data_only_service - The virtual channel carries a data service conforming to ATSC standards, but no video of stream_type 0x02 or audio of stream_type 0x81 |
| 0x05-0x3F | [Reserved for future ATSC use] |

FIG. 6

| Value | Meaning |
|---|---|
| 0x00 | [Reserved] |
| 0x01 | analog_television - The virtual channel carries analog television programming |
| 0x02 | ATSC_digital_television - The virtual channel carries television programming (audio, video and optional data) conforming to ATSC standards |
| 0x03 | ATSC_audio - The virtual channel carries audio programming (audio service and optional data) conforming to ATSC standards |
| 0x04 | ATSC_data_only_service - The virtual channel carries a data service conforming to ATSC standards, but no video of stream_type 0x02 or audio of stream_type 0x81 |
| 0x05 | Software Download Data Service – see A/97 |
| 0x06 | Unassociated/small screen service – see A/65C Amendment 1 |
| 0x07 | Parameterized Service – New A/V CODEC |
| 0x08 | ATSC_nrt_service — The virtual channel carries a NRT service conforming to ATSC standards |
| 0x09-0x7F | [ Reserved for future ] |
| 0x80-0xFF | [ User Private ] |

FIG. 7

| Syntax | No. of Bits | Format |
|---|---|---|
| virtual_channel_table_section(){ | | |
|     table_id | 8 | 0xC8 |
|     section_syntax_indicator | 1 | '1' |
|     Private_indicator | 1 | '1' |
|     reserved | 2 | '11' |
|     section_length | 12 | uimsbf |
|     table_id_extension | 16 | 010x0000 |
|     reserved | 2 | '11' |
|     version_number | 5 | uimsbf |
|     current_next_indicator | 1 | bslbf |
|     section_number | 8 | uimsbf |
|     last_section_number | 8 | uimsbf |
|     protocol_version | 8 | uimsbf |
|     num_channels_in_section | 8 | uimsbf |
|     for(i=0;i<num_channels_in_section;i++){ | | |
|         short_name | 7*16 | uimsbf |
|         reserved | 4 | '1111' |
|         major_channel_number | 10 | uimsbf |
|         minor_channel_number | 10 | uimsbf |
|         modulation_mode | 8 | uimsbf |
|         carrier_frequency | 32 | uimsbf |
|         channel_TSID | 16 | uimsbf |
|         program_number | 16 | uimsbf |
|         ETM_location | 2 | uimsbf |
|         access_controlled | 1 | bslbf |
|         hidden | 1 | bslbf |
|         reserved | 2 | '11' |
|         hide_guide | 1 | bslbf |
|         reserved | 3 | '111' |
|         service_type | 6 | uimsbf |
|         source_id | 16 | uimsbf |
|         reserved | 6 | '111111' |
|         descriptors_length | 10 | uimsbf |
|         for(i=0;i<N;i++){ | | |
|             descriptor() | | |
|         } | | |
|     } | | |
|     reserved | 6 | '111111' |
|     additional_descriptors_length | 10 | uimsbf |
|     for(j=0;j<N;j++){ | | |
|         additional_descriptor() | | |
|     } | | |
|     CRC_32 | 32 | rpchof |
| } | | |

FIG. 8

| Syntax | No. of Bits | Format |
|---|---|---|
| data_service_table_bytes() { | | |
|     sdf_protocol_version | 8 | 0x01 |
|     application_count | 8 | uimsbf |
|     for(j = 0; j < application_count; j++) { | | |
|         compatibility_descriptor() | | |
|         app_id_byte_length | 16 | uimsbf |
|         app_id_description | 16 | uimsbf |
|         for(i=0;i<app_id_byte_length-2;i++) { | | |
|             app_id_byte | 8 | bslbf |
|         } | | |
|         tap_count | 8 | 0x01 |
|         for( i = 0; i < tap_count; i++) { | | |
|             protocol_encapsulation | 8 | 0x04 |
|             action_type | 7 | '0000000' |
|             resource_location | 1 | bslbf |
|             tap_id | 16 | uimsbf |
|             use | 16 | 0x0004 |
|             association_tag | 16 | uimsbf |
|             selector_length | 8 | 0x00 |
|             tap_info_length | 16 | 0x04 |
|             descriptor_tag | 8 | 0xA7 |
|             descriptor_length | 8 | |
|             deviceId_address_range | 3 | 0x06 |
|             deviceId_IP_mapping_flag | 1 | '1' |
|             alignment_indicator | 1 | '0' |
|             reserved | 3 | '111' |
|             max_sections_per_datagram | 8 | 0x01 |
|         } | | |
|         app_data_length | 16 | uimsbf |
|         for( i = 0; i < app_data_length; i++) { | | |
|             app_data_byte | 8 | bslbf |
|         } | | |
|         app_info_length | 16 | uimsbf |
|         for( i=0; i< M; i++) { | | |
|             descriptor() | | |
|         } | | |
|     } | | |
|     service_info_length | 16 | uimsbf |
|     for(j=0; j<K;j++){ | | |
|         descriptor() | | |
|     } | | |
|     service_private_data_length | 16 | uimsbf |
|     for( j = 0; j < servicePrivateDataLength; j++) { | | |
|         service_private_data_byte | 8 | bslbf |
|     } | | |
| } | | |

FIG. 11

| Syntax | No.of Bits | Format |
|---|---|---|
| NRT_service_table_section() { | | |
|   table_id | 8 | 0xDB |
|   section_syntax_indicator | 1 | '0' |
|   private_indicator | 1 | '1' |
|   reserved | 2 | '11' |
|   section_length | 12 | uimsbf |
|   table_id_extension { | | |
|     SMT_NRT_protocol_version | 8 | uimsbf |
|     ensemble_id | 8 | uimsbf |
|   } | | |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   num_NRT_services | 8 | uimsbf |
|   for (j=0;j< num_NRT_services; j++) | | |
|   { | | |
|     NRT_service_id | 16 | uimsbf |
|     NRT_service_status | 2 | uimsbf |
|     SP_indicator | 1 | bslbf |
|     short_NRT_service_name_length /* m */ | 3 | uimsbf |
|     short_NRT_service_name | 16*m | |
|     reserved | 2 | '11' |
|     NRT_service_category | 6 | uimsbf |
|     num_components | 5 | uimsbf |
|     IP_version_flag | 1 | bslbf |
|     source_IP_address_flag | 1 | bslbf |
|     NRT_service_destination_IP_address_flag | 1 | bslbf |
|     if (source_IP_address_flag) | | |
|       source_IP_address | 32 or 128 | uimsbf |
|     if (NRT_service_destination_IP_address_flag) | | |
|       NRT_service_destination_IP_address | 32 or 128 | uimsbf |
|     for (j=0;j< num_components; j++) | | |
|     { | | |
|       reserved | 1 | '1' |
|       essential_component_indicator | 1 | bslbf |
|       component_destination_IP_address_flag | 1 | bslbf |
|       port_num_count | 5 | uimsbf |
|       component_destination_UDP_port_num | 16 | uimsbf |
|       if (component_destination_IP_address_flag) | | |
|         component_destination_IP_address | 32 or 128 | uimsbf |
|       reserved | 4 | '1111' |

FIG. 12

| | | |
|---|---|---|
| num_component_level_descriptors | 4 | uimsbf |
| for (k=0;k< num_components_level_descriptors; k++) | | |
| { | | |
|     component_level_descriptor() | var | |
| } | | |
| } | | |
| reserved | 4 | '1111' |
| num_NRT_service_level_descriptors | 4 | uimsbf |
| for (m=0; m<num_NRT_service_level_descriptors; m++) | | |
| { | | |
|     NRT_service_level_descriptor() | var | |
| } | | |
| } | | |
| reserved | 4 | '1111' |
| num_virtual_channel_level_descriptors | 4 | uimsbf |
| for (n=0; n<num_virtual_channel_level_descriptors; n++) { | | |
| { | | |
|     virtual_channel_level_descriptor() | var | |
| } | | |
| } | | |

FIG. 13

| Syntax | No.of Bits | Format |
|---|---|---|
| NRT_component_descriptor() { | | |
|     descriptor_tag | 8 | 0 x CB |
|     descriptor_length | 8 | uimsbf |
|     component_type | 7 | uimsbf |
|     component_encryption_flag | 1 | |
|     if (component_encryption_flag == '1') { | | |
|         num_STKM_streams | 8 | uimsbf |
|         for (i=0; i<num_STKM_streams; i++) { | | |
|             STKM_stream_id | 8 | uimsbf |
|         } | | |
|     NRT_component_ data(component_type) | var | |
| } | | |

FIG. 14

| Syntax | No.of Bits | Format |
|---|---|---|
| NRT_FLUTE_component_data(){ | | |
|   TSI | 16 | uimsbf |
|   session_start_time | 32 | uimsbf |
|   session_end_time | 32 | uimsbf |
|   reserved | 5 | '11111' |
|   tias_bandwidth_indicator | 1 | bslbf |
|   as_bandwidth_indicator | 1 | bslbf |
|   FEC_OTI_indicator | 1 | bslbf |
|   if (tias_bandwidth_indicator == '1') { | | |
|     tias_bandwidth | 16 | uimsbf |
|   } | | |
|   if (as_bandwidth_indicator == '1') { | | |
|     as_bandwidth | 16 | uimsbf |
|   } | | |
|   if (FEC_OTI_indicator == '1') { | | |
|     FEC_encoding_id | 8 | uimsbf |
|     FEC_instance_id | 16 | uimsbf |
|   } | | |
| } | | |

FIG. 15A

| Syntax | No. of Bits | Format |
|---|---|---|
| NRT_content_table_section ( ) { | | |
| table_id | 8 | 0xTBD |
| section_syntax_indicator | 1 | '1' |
| private_indicator | 1 | '1' |
| reserved | 2 | '11' |
| section_length | 12 | uimsbf |
| service_id | 16 | uimsbf |
| reserved | 2 | '11' |
| NCT_version_number | 5 | uimsbf |
| current_next_indicator | 1 | '1' |
| section_number | 8 | uimsbf |
| last_section_number | 8 | uimsbf |
| protocol_version | 8 | uimsbf |
| time_span_start | 32 | uimsbf |
| reserved | 5 | '11111' |
| time_span_length | 11 | uimsbf |
| num_items_in_section | 8 | uimsbf |
| for (j=0; j< num_items_in_section; j++) { | | |
| content_linkage | 16 | uimsbf |
| updates_available | 1 | bslbf |
| TF_available | 1 | bslbf |
| low_latency | 1 | bslbf |
| content_length_included | 1 | bslbf |
| playback_length_in_seconds | 20 | uimsbf |
| if (content_length_included==1) { | | |
| content_length | 40 | uimsbf |
| } | | |
| playback_delay_included | 1 | bslbf |
| expiration_included | 1 | bslbf |
| reserved | 2 | '11' |
| duration | 12 | uimsbf |
| if (playback_delay_included==1) { | | |
| reserved | 4 | '1111' |
| playback_delay | 20 | uimsbf |
| } | | |
| if (expiration_included==1) { | | |

FIG. 15B

| expiration | 32 | uimsbf |
|---|---|---|
| } | | |
| content_name_length | 8 | uimsbf |
| content_name_text() | var | |
| reserved | 4 | '1111' |
| content_descriptors_length | 12 | uimsbf |
| for (i=0; i<N; i++) { | | |
| content_descriptor() | | |
| } | | |
| } | | |
| reserved | 6 | '111111' |
| descriptors_length | 10 | uimsbf |
| for (i=0; i<M; i++) { | | |
| descriptor() | | |
| } | | |
| } | | |

FIG. 18

```
<?xml version="1.0" encoding="UTF-8"?>
<xs:schema xmlns="urn:atsc:nrt:flute:fdt:2009" xmlns:xs="http://www.w3.org/2001/XMLSchema"
targetNamespace="urn:atsc:nrt:flute:fdt:2009" elementFormDefault="qualified">
  <xs:element name="FDT-Instance" type="FDT-InstanceType"/>
  <xs:complexType name="FDT-InstanceType">
    <xs:sequence>
      <xs:element name="File" type="File-Type" maxOccurs="unbounded"/>
      <xs:element name="FDT-Content-ID" type="xs:usignedInt" minOccurs="0" maxOccurs="unbounded"/>    ①
        <xs:any namespace="##other" processContents="skip" minOccurs="0" maxOccurs="unbounded"/>
    </xs:sequence>
    <xs:attribute name="Expires" type="xs:string" use="required"/>
    <xs:attribute name="Complete" type="xs:boolean" use="optional"/>
    <xs:attribute name="Content-Type" type="xs:string" use="optional"/>
    <xs:attribute name="Content-Encoding" type="xs:string" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents="skip"/>
  </xs:complexType>
  <xs:complexType name="File-Type">
    <xs:sequence>
      <xs:element name="File-Content-ID" type="Content-ID-Type" minOccurs="0" maxOccurs="unbounded"/>    ②
        <xs:any namespace="##other" processContents="skip" minOccurs="0" maxOccurs="unbounded"/>
    </xs:sequence>
    <xs:attribute name="Content-Location" type="xs:anyURI" use="required"/>
    <xs:attribute name="TOI" type="xs:positiveInteger" use="required"/>
    <xs:attribute name="Content-Length" type="xs:unsignedLong" use="required"/>
    <xs:attribute name="Transfer-Length" type="xs:unsignedLong" use="optional"/>
    <xs:attribute name="Content-Type" type="xs:string" use="optional"/>
    <xs:attribute name="Content-Encoding" type="xs:string" use="optional"/>
    <xs:attribute name="Content-MD5" type="xs:base64Binary" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents="skip"/>
  </xs:complexType>
  <xs:complexType name="Content-ID-Type">
    <xs:attribute name="Content-ID" type="xs:unsignedInt" use="required"/>
    <xs:attribute name="entry" type="xs:boolean" default="false" use="optional"/>    ③
    <xs:anyAttribute processContents="skip"/>
  </xs:complexType>
</xs:schema>
```

FIG. 19

```
<?xml version="1.0" encoding="UTF-8"?>
<xs:schema xmlns="urn:atsc:nrt:flute:fdt:2009" xmlns:xs="http://www.w3.org/2001/XMLSchema"
targetNamespace="urn:atsc:nrt:flute:fdt:2009" elementFormDefault="qualified">
  <xs:element name="FDT-Instance" type="FDT-InstanceType"/>
  <xs:complexType name="FDT-InstanceType">
    <xs:sequence>
      <xs:element name="File" type="File-Type" maxOccurs="unbounded"/>
      <xs:element name="FDT-Content-ID" type="FDT-Content-ID-Type" minOccurs="0" maxOccurs="unbounded"/> ①
      <xs:any namespace="##other" processContents="skip" minOccurs="0" maxOccurs="unbounded"/>
    </xs:sequence>
    <xs:attribute name="Expires" type="xs:string" use="required"/>
    <xs:attribute name="Complete" type="xs:boolean" use="optional"/>
    <xs:attribute name="Content-Type" type="xs:string" use="optional"/>
    <xs:attribute name="Content-Encoding" type="xs:string" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents="skip"/>
  </xs:complexType>
  <xs:complexType name="File-Type">
    <xs:sequence>
      <xs:element name="File-Content-ID" type="Content-ID-Type" minOccurs="0" maxOccurs="unbounded"/>
      <xs:any namespace="##other" processContents="skip" minOccurs="0" maxOccurs="unbounded"/>
    </xs:sequence>
    <xs:attribute name="Content-Location" type="xs:anyURI" use="required"/>
    <xs:attribute name="TOI" type="xs:positiveInteger" use="required"/>
    <xs:attribute name="Content-Length" type="xs:unsignedLong" use="required"/>
    <xs:attribute name="Transfer-Length" type="xs:unsignedLong" use="optional"/>
    <xs:attribute name="Content-Type" type="xs:string" use="optional"/>
    <xs:attribute name="Content-Encoding" type="xs:string" use="optional"/>
    <xs:attribute name="Content-MD5" type="xs:base64Binary" use="optional"/>
    <xs:attribute name="FEC-OTI-FEC-Encoding-ID" type="xs:unsignedLong" use="optional"/>
    <xs:attribute name="FEC-OTI-FEC-Instance-ID" type="xs:unsignedLong" use="optional"/>
    <xs:attribute name="FEC-OTI-Maximum-Source-Block-Length" type="xs:unsignedLong" use="optional"/>
    <xs:attribute name="FEC-OTI-Encoding-Symbol-Length" type="xs:unsignedLong" use="optional"/>
    <xs:attribute name="FEC-OTI-Max-Number-of-Encoding-Symbols" type="xs:unsignedLong" use="optional"/>
    <xs:attribute name="FEC-OTI-Scheme-Specific-Info" type="xs:base64Binary" use="optional"/>
    <xs:anyAttribute processContents="skip"/>
  </xs:complexType>
  <xs:complexType name="FDT-Content-ID-Type"> ②
    <xs:sequence>
      <xs:element name="Entry-Content-Location" type="xs:anyURI" minOccurs="0" maxOccurs="unbounded"/>
    </xs:sequence>
    <xs:attribute name="Content-ID" type="xs:unsignedInt" use="required"/>
    <xs:anyAttribute processContents="skip"/>
  </xs:complexType>
  <xs:complexType name="Content-ID-Type">
    <xs:attribute name="Content-ID" type="xs:unsignedInt" use="required"/>
    <xs:attribute name="entry" type="xs:boolean" default="false" use="optional"/>
    <xs:anyAttribute processContents="skip"/>
  </xs:complexType>
</xs:schema>
```

METHOD FOR RECEIVING A BROADCAST SIGNAL AND BROADCAST RECEIVER

This application is a Continuation of application Ser. No. 13/591,829 filed on Aug. 22, 2012, which is a Continuation of application Ser. No. 12/591,416 filed on Nov. 18, 2009 and claims the benefit of U.S. Provisional Application No. 61/115,888, filed on Nov. 18, 2008, which is hereby incorporated by reference. This application also claims the benefit of U.S. Provisional Application No. 61/121,178, filed on Dec. 9, 2008, which is hereby incorporated by reference. This application also claims the benefit of U.S. Provisional Application No. 61/138,494, filed on Dec. 17, 2008, which is hereby incorporated by reference. This application also claims the benefit of U.S. Provisional Application No. 61/153,973, filed on Feb. 20, 2009, which is hereby incorporated by reference. This application also claims the benefit of U.S. Provisional Application No. 61/153,985, filed on Feb. 20, 2009, which is hereby incorporated by reference. This application also claims the benefit of U.S. Provisional Application No. 61/169,711, filed on Apr. 15, 2009, which is hereby incorporated by reference. This application also claims the benefit of U.S. Provisional Application No. 61/179,005, filed on May 17, 2009, which is hereby incorporated by reference. And this application also claims the benefit of U.S. Provisional Application No. 61/179,343, filed on May 18, 2009, which is hereby incorporated by reference.

BACKGROUND OF THE INVENTION

1. Field of the Invention

The present invention relates to a signaling method for a service transmitted by Non-Real-Time (hereinafter abbreviated NRT). The detailed information on the service through a terrestrial broadcast network and an operation of an NRT receiver for receiving to process the corresponding information and more particularly, to a broadcast receiver and a method of receiving a broadcast signal including an NRT service.

2. Discussion of the Related Art

A Non-Real-Time (NRT) service is one of the most powerful applications that will be utilized for future Digital Television (DTV) services. The NRT is accompanied by a non-real-time transmission (not real-time streaming), storage, and viewing operations. The NRT transmits a content of a file type on a surplus bandwidth via a broadcast medium such as terrestrial and the like. And, it is expected that the NRT will be implemented in various kinds of service functions including push VOD, targeted advertising and the like.

SUMMARY OF THE INVENTION

Accordingly, the present invention is directed to a method of receiving a broadcast signal in a broadcast receiver that substantially obviates one or more problems due to limitations and disadvantages of the related art.

An object of the present invention is to provide a method of receiving a broadcast signaling including a Non-Real-Time (NRT) service, wherein receiving a broadcast signal including first signaling information and second signaling information, identifying the NRT service based on the first signaling information, identifying an IP address of an NRT service signaling data based on the first signaling information and the second signaling information, receiving the NRT service signaling data by accessing the IP address, and downloading a desired NRT service based on the NRT service signaling data.

Another object of the present invention is to provide a broadcast receiver for receiving a broadcast signal including a Non-Real-Time (NRT) service, wherein a first receiving unit for receiving first signal information and second signaling information, a first handler for identifying the NRT service based on the first signaling information, a second handler for identifying an IP address of an NRT service signaling data based on the first signaling information and the second signaling information, a second receiving unit for receiving the NRT service signaling data by accessing the IP address, and a controller for downloading a desired NRT service based on the NRT service signaling data.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings;

FIG. 5 is an exemplary diagram of an Advanced Television Systems Committee (ATSC) service type according to the present invention;

FIG. 6 is an another exemplary diagram of an ATSC service type according to the present invention;

FIG. 7 is a diagram for a bit-stream section of a Terrestrial Virtual Channel Table (TVCT) section configured according to an embodiment of the present invention;

FIG. 8 is a diagram for a bit-stream syntax of a Data Service Table (DST) section to identify an NRT application configured according to an embodiment of the present invention;

FIGS. 11 and 12 are a diagram for a bit-stream syntax of Non-Real-Time Service Table (NST) extracted by a receiver from a received MPEG-2 TS configured according to an embodiment of the present invention;

FIG. 13 is a diagram for a bit-stream syntax of NRT_component_descriptor( ) configured according to an embodiment of the present invention;

FIG. 14 is a diagram for a bit-stream syntax of NRT_component_data_descriptor for File Delivery over Unidirectional Transport (FLUTE) file delivery configured according to an embodiment of the present invention;

FIGS. 15A and 15B are a diagram for a bit-stream syntax of an Non-Real-Time Content Table (NCT) section configured according to an embodiment of the present invention;

FIG. 18 is a diagram to explain a FDT schema for mapping a file to content_id according to an embodiment of the present invention;

FIG. 19 is a diagram to explain a FDT schema for mapping a file to content_id according to another embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Terminologies used for the present invention are selected from general terminologies, which are currently and widely used, in consideration of the functions in the present invention but may vary according to intentions of a person having an ordinary knowledge in the technical field, practices or the advent of new technology, etc. In specific case, a terminology may be arbitrarily chosen by the applicant(s). In such case, its detailed meaning shall be described in the Detailed Description of the Invention. Therefore, the terminology used for the present invention needs to be defined based on the intrinsic meaning of the terminology and the contents across the present invention instead of a simple name of the terminology.

Figure 1:
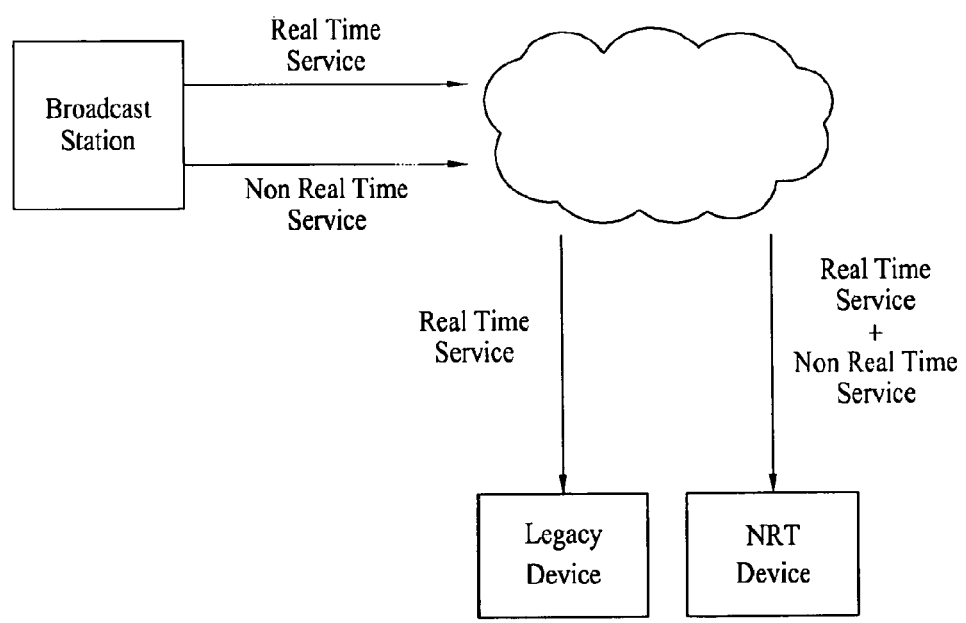
FIG. 1 is an exemplary conceptional diagram of an NRT service.

FIG. 1. is an exemplary conceptional diagram of an NRT service.

A broadcasting station transmits a real-time (hereinafter abbreviated RT) service according to a conventional method. In doing so, the broadcasting station transmits the RT service or the Non-Real-Time (NRT) service using a bandwidth left in the due course. In such case, the NRT service can contain a movie, news clip, weather information, advertisements, and contents for Push Video on Demand (VOD), and the like.

A legacy device has the principle that the operation is not affected by an NRT stream included within a channel. However, a DTV receiver, a related art, has a problem in receiving and processing the NRT service provided by a broadcasting station properly because of not having a means for processing unit for the NRT service.

On the contrary, a broadcast receiver according to the present invention, i.e., an NRT device is able to properly receive and process an NRT service combined with an RT service, thereby providing a viewer with more various functions than those of the related art DTV.

In this case, the RT service and the NRT service are transmitted on the same DTV channel or different DTV channels and are transmitted through an MPEG-2 transport packet (TP) or an internet protocol (IP) datagram. Hence, a receiver needs to identify the two kinds of services transmitted on the same or different channel. A method of defining and providing signaling information to enable a receiver to receive and process an NRT service is described. The broadcasting station provides signaling information of at least one unique packet identifier (PID) for identifying an NRT service.

Figure 2:
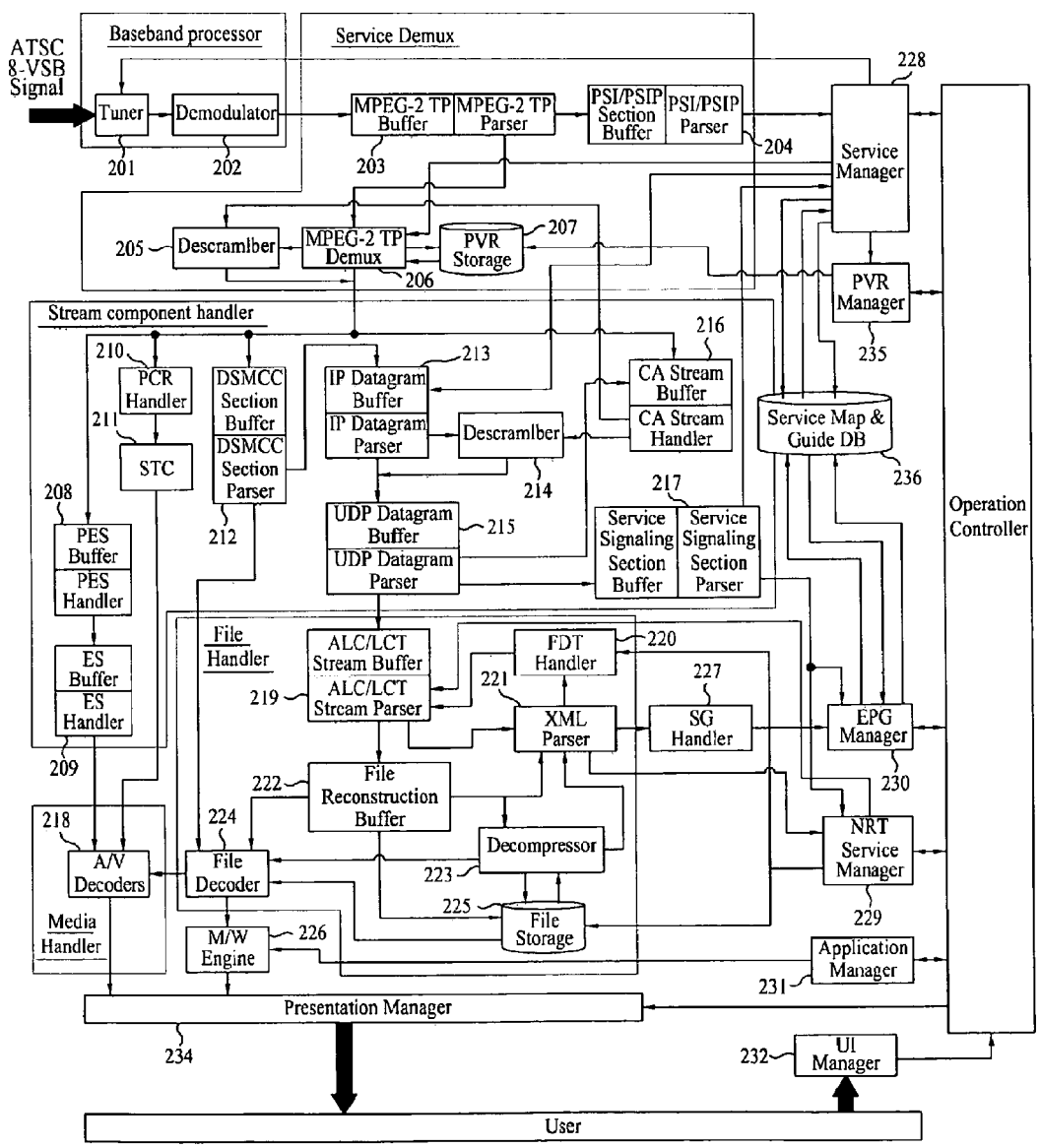
FIG. 2 is a block diagram of a receiving system according to an embodiment of the present invention.

FIG. 2 is a block diagram of a receiving system according to an embodiment of the present invention.

Referring to FIG. 2, the receiving system mainly includes a baseband processor, an MPEG-2 service demultiplexer (demux), a stream component handler, a media handler, a file handler, and other parts. The units of the receiving system shown in FIG. 2 are explained in the following.

First of all, the baseband processor includes a tuner 201 and a vestigial side band (VSB) demodulator 202. The tuner 201 detects VSB radio frequency (RF) signal transmitted over the air and then extracts a symbol from the detected VSB RF signal. In this case, the tuner 201 is controlled by a service manager 228. The VSB demodulator 202 reconstructs meaningful data by demodulating the VSB symbol extracted by the tuner 201.

The MPEG-2 service demultiplexer includes an MPEG-2 TP buffer/parser 203, a program specific information/program and system information protocol (PSI/PSIP) section/buffer 204, a descrambler 205, an MPEG-2 TP demultiplexer (demux) 206 and a personal video recorder (PVR) storage 207.

The MPEG-2 TP buffer/parser 203 buffers and reconstructs the MPEG-2 TP carried on a VSB signal and then detects and processes a TP header.

The PSI/PSIP section/buffer 204 buffers and parses PSI/PSIP section data carried on an MPEG-2 TS. In this case, the parsed PSI/PSIP data (Program Map Table (PMT), Terrestrial Virtual Channel Table (TVCT), and Data Service Table (DST)) is collected by the service manager 228 and is then stored as a service map and guide data in a database. The NRT service is identified using the parsed PSI/PSIP data (PMT, TVCT, and DST).

The descrambler 205 reconstructs data of a payload for a scrambled packet payload in the MPEG-2 TP, using an encryption key or the like, delivered from a conditional access (CA) stream handler 216.

The MPEG-2 TP demultiplexer 206 filters an MPEG-2 TP varied on a VSB signal or a TP depending on the receiver that is to process among the MPEG-2 TP stored in the PVR storage 207 and then relays the filtered TP to a proper processing module. In this case, the MPEG-2 TP demultiplexer 206 can be controlled by the service manager 228 and the PVR manager 235.

The PVR storage 207 stores the received MPEG-2 TP using the VSB signal when requested by the end-user and outputs the MPEG-2 TP when requested by the end-user. In this case, the PVR storage 207 can be controlled by the PVR manager 235.

The stream component handler includes a packetized elementary stream (PES) buffer/handler 208, an elementary stream (ES) buffer/handler 209, a program clock reference (PCR) handler 210, a system time clock (STC) unit 211, a digital storage media command and control (DSM-CC) section buffer/handler 212 which receives the NRT Service Table (NST), an IP datagram buffer/header parser 213, an end-user datagram protocol (UDP) datagram buffer/handler 215, a CA stream buffer/handler 216 and a service signaling section buffer/handler 217.

The PES buffer/handler 208 buffers and reconstructs a PES carried on an MPEG-2 TS.

The ES buffer/handler 209 buffers and reconstructs an ES such as audio data, video data or the like, which is transmitted as a PES, and then delivers the reconstructed ES to a proper A/V decoder 218.

The PCR handler 210 handles PCR data used for time synchronization of audio and video streams or the like.

The STC unit 211 corrects a clock value of the A/V decoder 218 using a reference clock value delivered via the PCR handler 210 to enable time synchronization.

The DSM-CC section buffer/handler 212 buffers and handles DSM-CC section data for a file transmission via the MPEG-2 TP and an IP datagram encapsulation. An actual IP level transmission is carried out in a well-known IP address, such that the receiver can receive an IP level without separately acquiring IP connection information.

The IP datagram buffer/header parser 213 buffers and reconstructs an IP datagram, which is encapsulated via DSM-CC addressable section and is then carried on an MPEG-2 TP. The IP datagram buffer/header parser 213 parses a header of each IP datagram through the reconstruction. In this case, the IP datagram buffer/header parser 213 is controlled by the service manager 228. The IP datagram buffer 213, the UDP datagram buffer 215, and the service signaling section parser 217 receives and processes the NRT Content Table (NCT) and NRT Service Table (NST) from the ATSC 8-VSB signal. The NCT and NST are transmitted through well-known IP address number and UDP port number.

If scrambling is applied to a payload in the received IP datagram, the descrambler 214 reconstructs data of the payload using an encryption key for the payload delivered from the CA stream handler 216.

The UDP datagram buffer/handler 215 buffers and reconstructs a UDP datagram carried on an IP datagram and also parses and processes a UDP header.

The CA stream buffer/handler 216 buffers and handles such data as a key value for descrambling, for example, an entitlement management message (EMM) transmitted for a conditional access function carried on an MPEG-2 TS or an IP stream, an entitlement control message (ECM). In this case, an output of the CA stream buffer/handler 216 is delivered to the descrambler 214 to perform a decryption operation of an MPEG-2 TP or an IP datagram that carries AV data, file data and the like.

The service signaling section buffer/parser 217 processes a signaling information like an NRT Service Table (NST), an NRT Content Table (NCT) and descriptors related to the NST or the NCT for signaling an NRT service of the present invention. The processed signaling information is transferred to the NRT service manager 229.

The media handler includes A/V decoders 218.

The AV decoders 218 decode compressions of audio and video data delivered via the ES handler 209 and then processes the decoded data, which are to be presented to an end-user.

The file handler includes an Asynchronous Layered Coding/Layered Coding Transport (ALC/CLT) buffer/parser 219, a file description table (FDT) handler 220, an extensible markup language (XML) parser 221, a file reconstruction buffer 222 and a decompressor 223.

The ALC/LCT buffer/parser 219 buffers and reconstructs ALC/LCT data carried on UDP/IP stream and then parses a header of ALC/LCT and a header extension thereof. In this case, the ALC/LCT buffer/parser 219 can be controlled by the NRT service manager 229.

The FDT handler 220 parses and processes a FDT of a File Delivery over Unidirectional Transport (FLUTE) protocol transmitted via an ALC/LCT session. It is able to transfer the processed FDT to the NRT service manager 229. The FDT handler 220 can also be controlled by the NRT service manager 229.

The XML parser 221 parses an XML document transmitted via the ALC/LCT session and then delivers the parsed data to such a proper module as the FDT handler 220, the SG handler 227 and the like.

The file reconstruction buffer 222 reconstructs a file transferred to the ALC/LCT and FLUTE session.

If the file transferred to the ALC/LCT and FLUTE session is compressed, the decompressor 223 performs a process for decompressing the compression.

The file decoder 224 decodes a file reconstructed by the file reconstruction buffer, a file decompressed by the decompressor 223, or a file extracted from the file storage 225.

The file storage 225 stores and extracts the received file. In this case, the received file may contain NRT content.

Finally, the remaining parts, not explained above, will be explained as follows.

A middleware (M/W) engine 226 processes data of a file that is not an AV stream transferred via a DSM-CC section or an IP diagram, and then delivers the processed data to the presentation manager 234.

The SG handler 227 collects and parses service guide data transferred in an XML document format and then delivers the parsed data to the EPG manager 230.

The service manager 228 produces a service map by collecting and parsing the PSI/PSIP data carried on MPEG-2 TS and service signaling section data carried on an IP stream and then controls an access to a service specified by an end-user by storing the service map in a service map & guide database. In this case, the service manager 228 is controlled by an operation controller 230 and then controls the tuner 201, the MPEG-2 TP demultiplexer 206, the IP datagram buffer/handler 213, and the NRT service manager 229.

The NRT service manager 229 performs overall managements on the NRT service transferred in an object/file format via FLUTE session on an IP layer. The NRT service manager 229 parses the signaling information transferred from the service signaling section buffer/parser 217. And, the parsed signaling information is transferred to the service map & guide database 236 to be stored therein. Moreover, the NRT service manager 229 controls NCT information, which correspond to contents related to a service guide in the signaling information, to be transferred to the EPG manager 230, thereby forming EPG data. In this case, the NRT service manager 229 controls the FDT handler 220, the file storage 225 and the like. Therefore, the NRT service manager 229 receives the FDT from the FDT handler 220, parses the received FDT and then controls received NRT contents to be stored as a hierarchical structure in the file storage 225. And, the NRT service manager 229 controls the corresponding NRT contents to be extracted from the file storage 225 in case that a user makes a selection for the NRT service. The service map & guide database 236 may further store information containing future download time and contents, including files associated with the contents, inputted by the end-user through UI Manager 232. Following such an input from the end-user, when the download time has been reached, the service map & guide database will start downloading the contents through operation controller 233, EPG manager and stores the content.

The EPG manager 230 receives the service guide data from the SG handler 227, configures EPG data, and then controls the EPG data to be displayed. The EPG manager 230 will configure the service guide information and UI manager 232 will display the NRT service guide to end-user based on the defined NCT fields. Therefore, the title, available time for download, and the estimated download time are displayed so the end-user can choose the content or the files associated with the content that the end-user wishes to download.

The application manager 231 performs overall managements on processing of application data transferred in such a format as an object, a file and the like.

The user interface (UI) manager 232 delivers an input of a user via a UI to the operation controller 233 and enables an operation of a process for a user-requested service to be initiated.

The operation controller 233 processes a user's command delivered via the UI manager 232 and then enables a manager of a necessary module to perform a corresponding action.

And, the presentation manager 234 provides at least one of A/V data outputted from the A/V decoder 218, file data outputted the middleware (M/W) engine 226 and EPG data outputted from the EPG manager 230 to user via speaker and/or screen.

Figure 3:
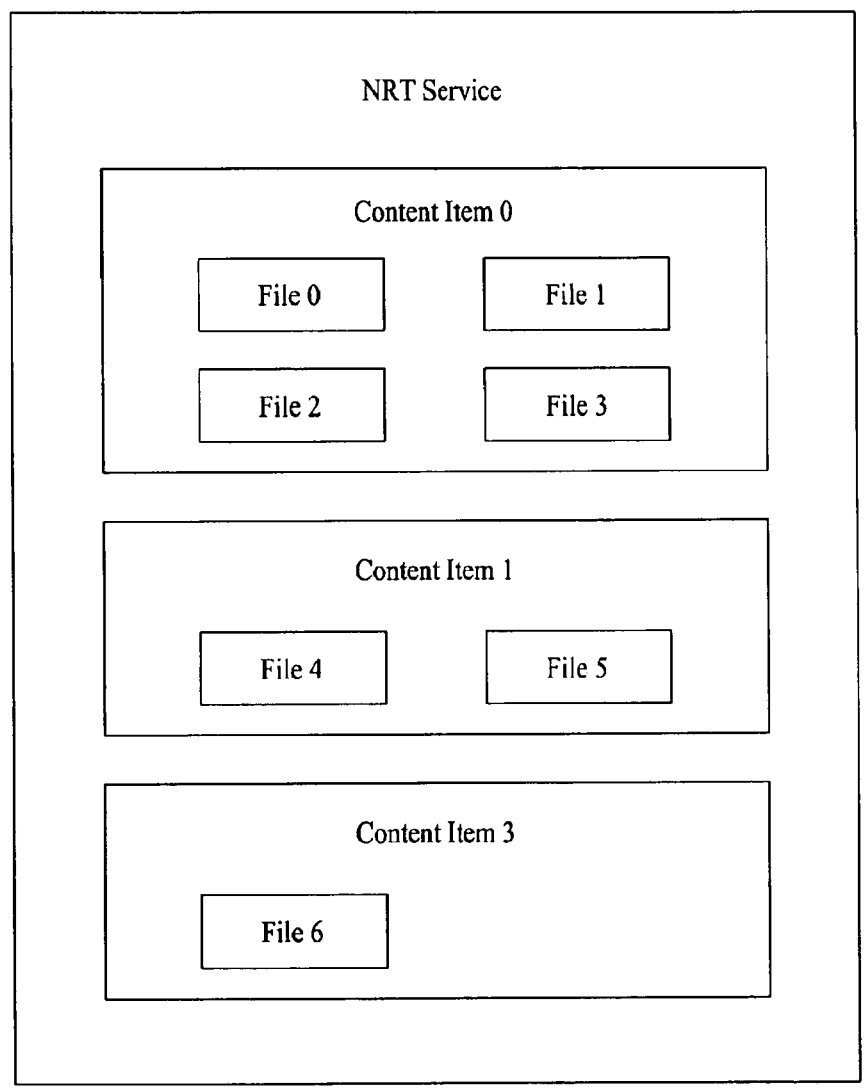
FIG. 3 is an exemplary diagram explaining relations between an NRT service, content items and files.

FIG. 3 is an exemplary diagram explaining relations between an NRT service, content items and files.

Referring to FIG. 3, an NRT service can include one or more content items. And, each of the content items can include one or more files. And, each of the content items is an independent entity and may correspond to a program or an event in a real time broadcast. Therefore, the NRT service can be defined as a group that is able to service in combination of the above content items.

In order for a receiver to properly process the above NRT service, signaling for the corresponding NRT service is required. The present invention intends to properly process an NRT service received by a receiver by defining and providing the signaling information. The details of the signaling information shall be described in the description of the corresponding part.

NRT services can be mainly categorized into a fixed NRT service and a mobile NRT service. In the following description, the fixed NRT service is taken as an example for an embodiment of the present invention. As shown in FIG. 3, an NRT service may include one or more contents and the contents can have one or more files associated with the contents.

Figure 4:
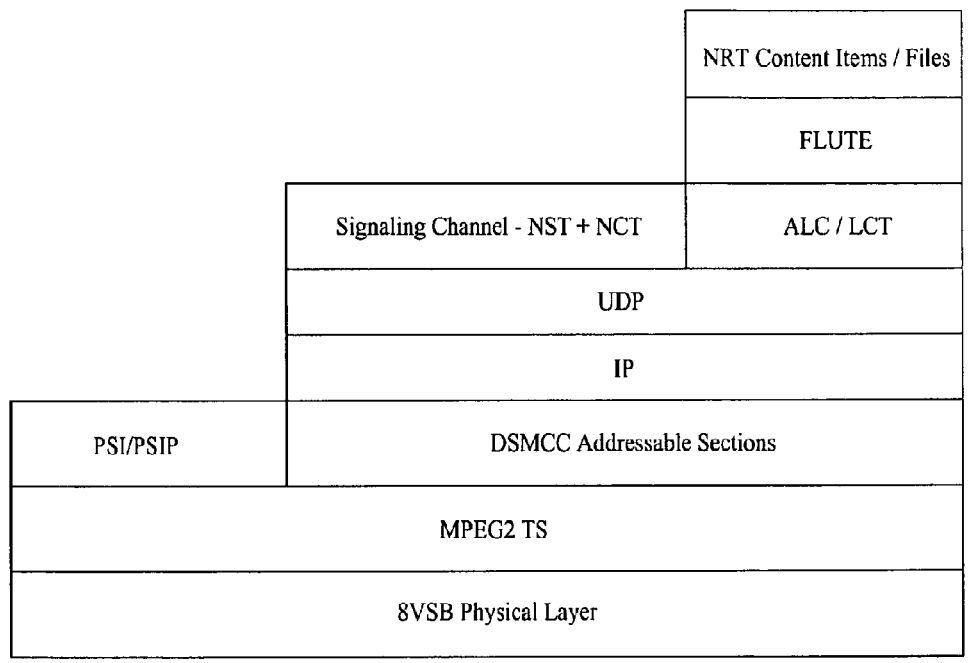
FIG. 4 is a diagram for a protocol stack of a fixed NRT service configured according to an embodiment of the present invention.

FIG. 4 is a diagram for a protocol stack of a fixed NRT service configured according to an embodiment of the present invention.

Referring to FIG. 4, a protocol stack for providing a fixed NRT service transmitting NRT content items and/or files is illustrated. The IP datagram includes NRT content items and/or files and signaling channel for providing NST and NCT. Program and System Information/Program and System Information Protocol (PSI/PSIP) data is delivered through an MPEG-2 TS format.

In FIG. 4, the fixed NRT service is packetized according to User Datagram Protocol (UDP) in an IP layer. The UDP packet becomes UDP/IP packet data by being packetized again according to an IP scheme. In this disclosure, the packetized UDP/IP packet data is referred to as an IP datagram.

The NRT content items/files are packetized according to File Delivery over Unidirectional Transport (FLUTE) scheme or Asynchronous Layered Coding/Layered Coding Transport (ALC/LCT) scheme. The ALC/LCT packet is transported by being encapsulated in a UDP datagram. The ALC/LCT/UDP packet is packetized into ALC/LCT/UDP/IP packet according to IP datagram scheme to become an IP datagram. This IP datagram is contained in MPEG-2 TS through DSM-CC addressable sections for transport. In this case, the ALC/LCT/UDP/IP packet is the information on FLUTE session and includes a File Delivery Table (FDT) as well.

A signaling information channel including an NST and an NCT is packetized according to a UDP scheme. This UDP packet is packetized according to an IP scheme again to become UDP/IP packet data, IP datagram. This IP datagram is also contained in the MPEG-2 TS through the DSM-CC addressable sections for transport.

And, a PSI/PSIP table is separately defined and contained in the MPEG-2 TS. The PSI/PSIP data includes signaling information (PMT, TVCT, and DST) for identifying an NRT.

The MPEG-2 TS containing the above described NRT content items/files, signaling information channel and PSI/PSIP data therein are transferred by being modulated by a predetermined transmission scheme such as VSB transmission scheme.

According to the present invention, a fixed NRT service uses a conventional ATSC terrestrial broadcasting environment. In particular, a fixed NRT service, which is based on a scheme of transporting an IP datagram via DSM-CC addressable section, can be provided by the following method for example.

1. Case of Transmission on Virtual Channel Including Audio and/or Video:

In this case, a service type of a corresponding virtual channel can follow FIG. 5 as stipulated in the conventional ATSC specification. This service type is a field defined in the TVCT of FIG. 7. In particular, the service type follows '0x04' indicating ATSC data only service shown in FIG. 5 which shows the NRT service category and its meanings.

Alternatively, the service type can identify an NRT service by being included in another service type of the related art.

2. Case of Transmission on Virtual Channel Including NRT Service Only:

Referring to FIG. 6, a NRT service category and its meanings, signaling can be performed to indicate an NRT application ('0x08') by allocating a new service type value. This service type is a field defined in the TVCT of FIG. 7.

FIG. 7 is a diagram for a bit-stream section of a Terrestrial Virtual Channel Table (TVCT) section configured according to an embodiment of the present invention.

Referring to FIG. 7, a Terrestrial Virtual Channel Table (TVCT) section is described as having a table format similar to that of an MPEG-2 private section. However, this is merely exemplary, and the present invention will not be limited to the example given herein.

The TVCT can be divided into a header, a body and a trailer. The header part ranges from table_id field to protocol_version field. And, transport_stream_id field is a 16-bit field and indicates an MPEG-2 TSID within a Program Association Table (PAT) defined by a PID value of '0' for multiplexing. In the body part, num_channels_in_section field is an 8-bit field and indicates the number of virtual channels within a VCT section. Finally, the trailer part includes CRC_32 field.

First of all, the header part is explained as follows.

A table_id field is an 8-bit unsigned integer number that indicates the type of table section being defined herein. For the terrestrial_virtual_channel_table_section( ), the table_id shall be '0xC8'.

A section_syntax_indicator is a one-bit field which shall be set to '1' for the terrestrial_virtual_channel_table_section( ).

A private_indicator field (1-bit) shall be set to '1'.

A section_length is a twelve bit field, the first two bits of which shall be '00'. This field specifies the number of bytes of the section, starting immediately following the section_length field, and including the CRC. The value in this field shall not exceed 1021.

A table_id_extension field is set to '0x000'.

A version_number field (5-bit) represents the version number of the VCT.

A current_next_indicator is a one-bit indicator, which when set to '1' indicates that the VCT sent is currently applicable.

A section_number field (8 bit) gives the number of this section. The section_number of the first section in the TVCT shall be '0x00'.

A last_section_number field (8 bit) specifies the number of the last section (that is, the section with the highest section_number) of the complete TVCT.

A protocol_version is an 8-bit unsigned integer field whose function is to allow, in the future, this table type to carry parameters that may be structured differently than those defined in the current protocol. At present, the only valid value for protocol_version is zero. Non-zero values of protocol_version may be used by a future version of this standard to indicate structurally different tables.

The body part is explained as follows.

A num_channels_in_section field (8-bit) specifies the number of virtual channels in this VCT section. The number is limited by the section length.

A short_name field represents the name of the virtual channel, represented as a sequence of one to seven 16-bit code values.

A major_channel_number field is a 10-bit number that represents the "major" channel number associated with the virtual channel being defined in this iteration of the "for" loop. Each virtual channel shall be associated with a major and a minor channel number. The major channel number, along with the minor channel number, act as the user's reference number for the virtual channel.

A minor_channel_number field is a 10-bit number in the range '0' to '999' that represents the "minor" or "sub"-channel number. This field, together with major_channel_number, performs as a two-part channel number, where minor_channel_number represents the second or right-hand part of the number. When the service_type is analog television, minor_channel_number shall be set to '0'. Services whose service_type is either ATSC_digital_television or ATSC_audio_only shall use minor numbers between '1' and '99'. The value of minor_channel_number shall be set such that in no case is a major_channel_number/minor_channel_number pair duplicated within the TVCT.

A modulation_mode field is an 8-bit unsigned integer number that indicates the modulation mode for the transmitted carrier associated with this virtual channel.

A carrier_frequency field includes the recommended value for these 32 bits is zero. Use of this field to identify carrier frequency is allowed, but is deprecated.

A channel_TSID is a 16-bit unsigned integer field in the range '0x0000' to '0xFFFF' that represents the MPEG-2 TSID associated with the TS carrying the MPEG-2 program referenced by this virtual channel.

A program_number field is a 16-bit unsigned integer number that associates the virtual channel being defined here with the MPEG-2 PROGRAM ASSOCIATION and TS PROGRAM MAP tables. For virtual channels representing analog services, a value of '0xFFFF' shall be specified for program_number.

An ETM_location is 2-bit field specifies the existence and the location of an Extended Text Message (ETM).

An access_controlled is a 1-bit Boolean flag that indicates, when set, that the events associated with this virtual channel may be access controlled. When the flag is set to '0', event access is not restricted.

A hidden is a 1-bit Boolean flag that indicates, when set, that the virtual channel is not accessed by the user by direct entry of the virtual channel number. Hidden virtual channels are skipped when the user is channel surfing, and appear as if undefined, if accessed by direct channel entry. Typical applications for hidden channels are test signals and NVOD services. Whether a hidden channel and its events may appear in EPG displays depends on the state of the hide_guide bit.

A hide_guide is a Boolean flag that indicates, when set to '0' for a hidden channel that the virtual channel and its events may appear in EPG displays. This bit shall be ignored for channels which do not have the hidden bit set, so that non-hidden channels and their events may always be included in EPG displays regardless of the state of the hide_guide bit. Typical applications for hidden channels with the hide_guide bit set to '1' are test signals and services accessible through application-level pointers.

A service_type is a 6-bit enumerated type field that shall identify the type of service carried in this virtual channel.

A source_id field (16-bit) represents a programming source associated with a virtual channel.

A descriptors_length field is total length (in bytes) of the descriptors for this virtual channel that follows.

A descriptor( ) field includes zero or more descriptors, as appropriate, may be included.

An additional_descriptors_length field is total length (in bytes) of the VCT descriptor list that follows.

The trailor part is explained as follows. CRC_32 is a 32-bit field that contains the cyclic redundancy check (CRC) value that ensures a zero output from the registers in the decoder.

NRT content is transferred through IP mechanism. In order to transfer IP datagram through a digital broadcast stream, ATSC has regulated ATSC A/90 and A/92 specifications.

In the above description, the data service table (DST) may be received through a PID included in service_location_descriptor. And, it is able to know a type of application and detailed information of a data broadcast stream carried on this channel through the DST.

According to FIG. 8, it is able to use a DST to identify an NRT service. The DST is explained as follows.

FIG. 8 is a diagram for a bit-stream syntax of a DST section to identity an NRT application configured according to an embodiment of the present invention.

The semantics of the fields comprising the data_service_table_bytes structure are defined below.

An sdf_protocol_version is an 8-bit field which shall be used to specify the version of the Service Description Framework (SDF) protocol. The value of this field shall be set to '0x01'. The value '0x00' and the values in the range '0x02' to '0xFF' shall be ATSC reserved.

An application_count_in_section is an 8-bit field (8-bit) shall specify the number of applications listed in the DST section.

A compatibility_descriptor( ) field shall contain a DSM-CC compatibility descriptor. Its purpose shall be to signal compatibility requirements of the application so that the receiving platform can determine its ability to use this data service.

An app_id_byte_length field (16-bit) shall specify the number of bytes used to identify the application. The value of this field shall account for the length of both the app_id_description field and the app_id_byte fields that follow. The value '0x0000' shall indicate that no app_id_description field or app_id_byte fields follow. The value '0x0001' is forbidden.

An app_id_description field (16-bit) shall specify the format and semantics of the following application identification bytes.

Table 1 specifies the values and associated formats.

TABLE 1

| Value | Application Identifier Format |
|---|---|
| 0x0000 | DASE application |
| 0x0001 | ATSC reserved |
| 0x0002 | ATSC A/92 Application |
| 0x0003 | NRT Application |
| 0x0004-0x7FFF | ATSC reserved |
| 0x8000-0xFFFF | User private |

An app_id_byte field (8-bit) shall represent a byte of the application identifier.

A tap_count field (8-bit) shall specify the number of Tap( ) structures used by this application.

A protocol_encapsulation field (8-bit) shall specify the type of protocol encapsulation used to transmit the particular data element referred to by the Tap( ).

TABLE 2

| Value | Encapsulated Protocol |
|---|---|
| 0x00 | Not in a MPEG-2 Transport Stream |
| 0x01 | Asynchronous non-flow controlled scenario of the DSM-CC Download protocol encapsulated in DSM-CC sections |
| 0x02 | Non-streaming Synchronized Download protocol encapsulated in DSM-CC sections |
| 0x03 | Asynchronous multiprotocol datagrams in Addressable Sections using LLC/SNAP header |
| 0x04 | Asynchronous IP datagrams in Addressable Sections |
| 0x05 | Synchronized streaming data encapsulated in PES |
| 0x06 | Synchronous streaming data encapsulated in PES |
| 0x07 | Synchronized streaming multiprotocol datagrams in PES using LLC/SNAP header |
| 0x08 | Synchronous streaming multiprotocol datagrams in PES using LLC/SNAP header |
| 0x09 | Synchronized streaming IP datagrams in PES |
| 0x0A | Synchronous streaming IP datagrams in PES |
| 0x0B | Proprietary Data Piping |
| 0x0C | SCTE DVS 051 asynchronous protocol [19] |
| 0x0D | Asynchronous carousel scenario of the DSM-CC Download protocol encapsulated in DSM-CC sections |
| 0x0E | Reserved for harmonization with another standard body |
| 0x0F-0x7F | ATSC reserved |
| 0x80-0Xff | User defined |

An action_type field (7-bit) shall be used to indicate the nature of the data referred to by the Tap( ).

A resource_location field (1-bit) shall specify the location of the Association Tag field matched with the association_tag value listed in the following Tap structure. This bit shall be set to '0' when the matching association_tag resides in the PMT of the current MPEG-2 program. This bit shall be set to '1' when the matching association_tag resides in a DSM-CC Resource Descriptor within the Network Resources Table of this Data Service.

A tap_id field (16-bit) shall be used by the application to identify the data elements. The value of tap_id is scoped by the value of the app_id_byte fields associated with the Tap ( ) in the DST. The tap_id field is unique within an application. The tap_id value is selected by the data service provider at authoring time. It is used in the application as a handle to the data element.

A use field (16-bit) is used to characterize the communication channel referenced by the association_tag. Use of use values other than '0x0000' is beyond the scope of this standard. The use value '0x0000' indicates that this field is unknown.

An association_tag field (16-bit) shall uniquely identify either a data elementary stream listed in the PMT or a DSM-CC Resource Descriptor listed in the Network Resource Table. In the former case, the value of this field shall be matched with the association_tag value of an association_tag_descriptor in the PMT of the data service. In the latter case, the value of this field shall match the association_tag value in the commonDescriptorHeader structure of a DSM-CC Resource Descriptor in the Network Resource Table of the data service.

A selector_length is an 8-bit field which shall specify the length of the remaining selector structure in bytes. A value equal to 0 shall indicate that no selector information is present. When the value of the selector_type field is equal to 0x0102, this field shall be set to a value less or equal to 8.

A tap_info_length is a 16-bit field which shall specify the number of bytes of the descriptors following the tap_info_length field.

A descriptor_tag is a 8-bit field which shall be set to 0xA6.

A descriptor_length is a 8-bit field which shall specify the length in bytes of the fields immediately following this field up to the end of this descriptor.

A deviceId_address_range is a 3-bit field which shall indicate the number of valid deviceId address bytes that the service uses.

A deviceId_IP_mapping_flag is a 1-bit field which shall be set to "1" to signal an IP to MAC address mapping. This flag shall be set to "0" for any other device ID address mapping.

An alignment_indicator is a 1-bit field which shall be set to 0 to indicate byte level alignment between the DSMCC_addressable_section and the Transport Stream bytes.

A max_sections_per_datagram is a 8-bit field which shall indicate the maximum number of Sections that can be used to carry a single datagram unit.

An app_data_length field (16-bit) shall specify the length in bytes of the following app_data_byte fields.

An app_data_byte field (8-bit) shall represent one byte of the input parameters and other private data fields associated with the application.

An app_info_length is an 8-bit field which shall specify the number of bytes of the descriptors following the app_info_length field.

A descriptor( )shall follow the descriptor format.

A service_info_length (8-bit) shall specify the number of bytes of the descriptors following the service_info_length field.

Another descriptor( ) field shall follow the descriptor format.

A service_private_data_length field (16-bit) shall specify the length in bytes of the private fields to follow.

A service_private_data_byte field (8-bit) shall represent one byte of the private field.

After the NRT application has been identified, a PID for detecting an IP stream and an IP information on which a well-known IP address for delivering NRT service signaling data delivered via an IP layer, are searched for using tap information and multiprotocol encapsulation descriptor.

If a value of protocol_encapsulation is set to '0x04', an asynchronous IP datagram is transferred. If selector_type is set to '0x0102', a value of device_id, which indicates a destination address, is delivered through selector_bytes. In order to accurately interpret a value of the selector_bytes, multiprotocol_encapsulation_descriptor is used. And, the number of valid bytes in the device_id value is signaled.

Therefore, it is able to know a multicast address (or, an address range) of an IP datagram carried on the corresponding PID via the tap information.

Through the Tap, it is checked as to which IP stream will be delivered through the PID. And this is received in the first place. An IP packet is then received.

The NRT service signaling data is extracted from the IP packet. The extracted NRT service signaling data is delivered to and processed by a Service Signaling Section Buffer/Parser. An NRT service can be then initiated.

Figure 9:
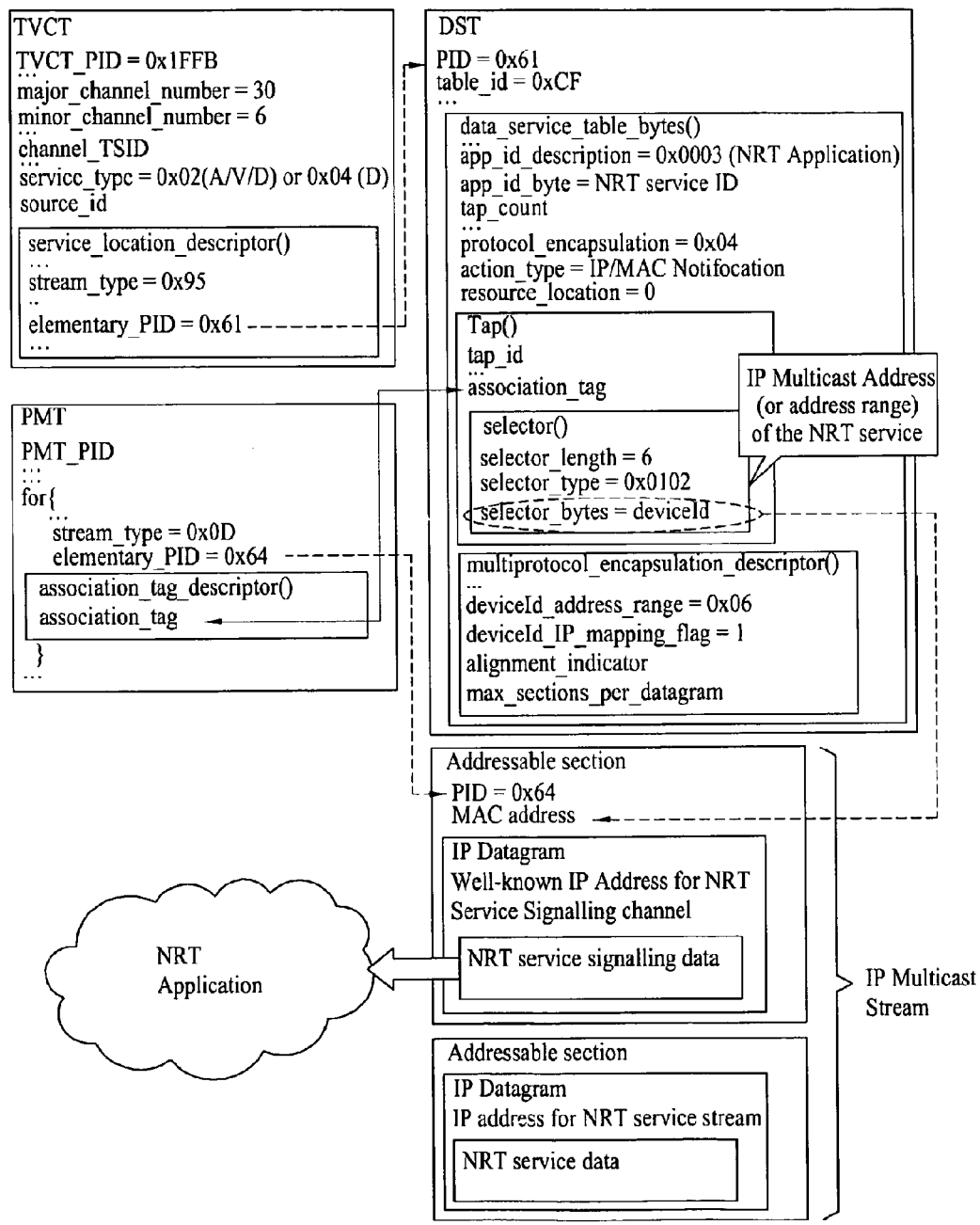
FIG. 9 is a diagram for a signaling method in case of transmitting an NRT service through an ATSC broadcasting system according to an embodiment of the present invention.
Figure 10:
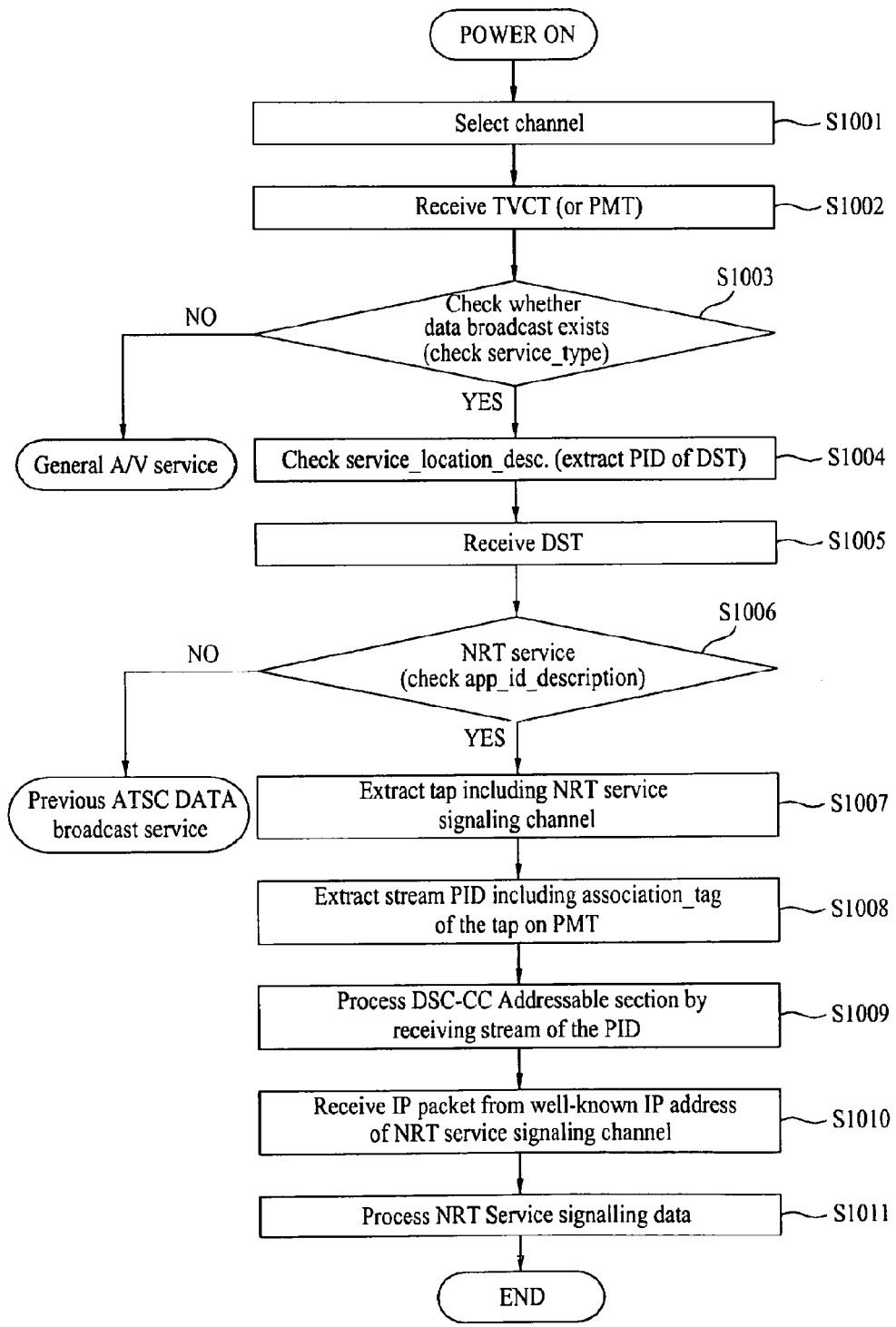
FIG. 10 is a flowchart for FIG. 9.

FIG. 9 is an exemplary diagram for a signaling method in case of transmitting an NRT service through an ATSC broadcasting system according to another embodiment of the present invention, and FIG. 10 is an exemplary flowchart for FIG. 9.

FIG. 9 shows a method of configuring a separate NRT service signaling channel via an IP side. In this case, the NRT service signaling channel is multicasted by being encapsulated in an IP datagram via a well-known IP address. A signaling structure for this case is shown in FIG. 9. In particular, it can be observed that a separate NRT service signaling channel exists as an IP multicast stream, whereas every signaling is performed by a PSIP side.

The TVCT is similar to a channel concept and for example, the TVCT_PID equals to '0x1FFB.' The service_type of TVCT refers to the service of the present TVCT which identifies that the service is an NRT application and the stream_type which equals to for example '0x95' means that it is association with the Data Service Table (DST). The app_id_description field in the DST also identifies that the service is an NRT application. As shown in FIG. 9, the association_tag of the PMT has the same value with the Tap association_tag in the DST. After matching the association tag between the PMT and the DST, the elemenrayr_PID of the PMT is needed to identify the IP datagram of the NRT service signaling channel or the NRT service. As explained above, when the protocol_encapsulation=0x04, an asynchronous IP datagram is transferred. If selector_type is set to '0x0102', a value of device_id, which indicates a destination address, is delivered through selector_bytes. In order to accurately interpret a value of the selector_bytes, multiprotocol_encapsulation_descriptor is used. And, the number of valid bytes in the device_id value is signaled.

A Tap( ) in the DST is used to find an application-level data element contained in a lower-layer communication channel. An association is made between the application-level data element and the Tap( ) through the use of an association_tag field. The value of the association_tag field in a Tap structure shall correspond to the value of either an association_tag field located in one Association Tag descriptor residing in the current PMT or an associationTag field located in the commonDescriptorHeader of one of the dsmccResourceDescriptor descriptors residing in the Network Resource Table. In a data service, the same association_tag value may be featured in more than one Tap structure. The association_tag shall be used as the base for determining the location of a data element. Relative to this base, the location of the data element may be further specified by means of the selector structure. A data receiver needs a reference list of all synchronized data elementary streams in a data service to be able to partition the Data Elementary Stream Buffer properly. Consequently, the DST shall include at least one Tap( ) for each of the data elementary streams of stream_type value 0x06 or 0x14 belonging to the data service.

A multiprotocol_encapsulation_descriptor may be included in the descriptor loop following the Tap structure in the Data Service Table when the value of the protocol_encapsulation field is equal to 0x03 or 0x04. The descriptor provides information defining the mapping of the deviceId fields to a specific addressing scheme. The descriptor also provides information on the number of valid bytes in the devideId fields specified in the selector bytes of a Tap( ) including a selector_type field value equal to 0x0102. Finally, this descriptor may be used to signal alignment and protocol fragmentation rules.

A deviceId_address_range=0x06 means that the valid deviceID_address bytes equal to deviceId[47 . . . 0]. Further deviceId_IP_mapping_flag, when set to 1 means to signal an IP to MAC address mapping.

An alignment_indicator shall indicate byte level alignment between the DSMCC_addressable_section and the Transport Stream bytes.

And max_sections_per_datagram, an 8-bit field, shall indicate the maximum number of Sections that can be used to carry a single datagram unit.

Further, the well-known IP address for NRT service signaling channel (NST and NCT) is defined through elementary_PID associated with the PMT. Moreover, the NRT service signaling data is transmitted and received through the well-known IP address for NRT service signaling channel of the IP Datagram. The NRT service signaling data can be transmitted in Transport Packet (TP) or via Internet Protocol (IP).

FIG. 10 is a flowchart of the above explanation.

Referring to FIG. 10, after a power of a receiver has been turned on, if a default channel or a channel by a user is selected [S1001], the receiver receives a TVCT or a PMT [S1002].

With regard to this, information on a stream configuring each virtual channel is signaled to service_location_descriptor of the TVCT or the ES_loop of the PMT.

Therefore, the receiver determines a type of a service provided on a selected channel by parsing service_type within the received TVCT [S1003]. For instance, if a value of the service_type is set to '0x02', a type of a corresponding service provided on the selected channel may mean a digital A/V Data service type. If a value of the service_type is set to '0x04', a type of a corresponding service provided on the selected channel may mean a data only service type. If a value of the service_type is set to '0x08', a type of a corresponding service provided on the selected channel may mean an NRT only service type.

As a result of the determining step [S1003], if the corresponding service type is not a general A/V service, PID ('0x61') of a data service table (DST) is extracted by parsing service_location_descriptor in the channel loop of the TVCT [S1004].

Subsequently, the DST is received using the extracted PID [S1005].

It is then determined whether the corresponding service provided on the selected channel is an NRT service from the received DST [S1006]. In doing so, the determination of a presence or absence of the NRT service can be performed by checking app_id_description within the DST. For instance, if a value of the app_id_description is set to '0x0003', it means that the corresponding service is an NRT application.

As a result of the determining step [S1006], if the corresponding service is an NRT service, a tap including an NRT service signaling channel is extracted [S1007]. And, elementary_PID including association_tag of the tap on the PMT is extracted [S1008].

After the elementary_PID has been received, a DSM-CC addressable section is processed [S1009].

Subsequently, after an IP packet has been received from a well-known IP address of the NRT service signaling channel

[S1010], an NRT service is provided by processing the NRT service signaling data within the received IP packet [S1011].

With regard to this, after checking whether the NRT application exists on the virtual channel by the above method, an IP stream carrying the well-known IP address, to which the NRT service signaling data carried via an IP layer is delivered, is searched for using the tap information.

If a value of protocol_encapsulation is set to '0x04', an asynchronous IP datagram is transferred. If selector_type is set to '0x0102', a value of device_id indicating a destination address is delivered via selector_bytes.

Therefore, a PID of a transport stream can be known, on which the corresponding data is carried, through the tap information on a multicast address (or, an address range) of an IP datagram. It is checked whether a well-known IP address, to which NRT service signaling data will be delivered, is loaded on the tap. This is received in the first place. An IP packet is then received.

Subsequently, NRT service signaling data is extracted from the IP packet. The extracted NRT service signaling data is delivered to an NRT application manager. A corresponding service is then initiated.

FIGS. 11 and 12 are an exemplary diagram for a bit-stream syntax of NST configured according to an embodiment of the present invention.

In this case, although a corresponding syntax is written as an MPEG-2 private section to help the understanding, a format of corresponding data can have any type. For instance, SDP( ) is used to perform signaling via a Session Announcement Protocol (SAP).

NST/NCT describes service information and IP access information within a virtual channel carrying the NST/NCT. The NST/NCT also provides broadcast stream information of a corresponding service using TSID that is an identifier of a broadcast stream to which each service belongs. And, NST according to the present embodiment includes description information of each fixed NRT service within one virtual channel. And, other side information can be included in a descriptor region.

A table_id field is an 8-bit unsigned integer number that indicates the type of table section being defined in NST.

A section_syntax_indicator field (1-bit) shall be set to '0' to always indicate that this table is derived from the short form of the MPEG-2 private section table.

A private_indicator field (1-bit) shall be set to '1'.

A section_length field (12-bit) specifies the number of remaining bytes this table section immediately following this field. The value in this field shall not exceed 4093 ('0xFFD').

A table_id_extension field (16-bit) is table-dependent. It shall be considered to be logically part of the table_id field providing the scope for the remaining fields. Herein, the table_id_extension field includes an NST_protocol_version field.

The NST_protocol_version is an 8-bit unsigned integer field whose function is to allow, in the future, this NRT Service Table to carry parameters that may be structured differently than those defined in the current protocol. At present, the value for the NST_protocol_version shall be zero. Non-zero values of NST_protocol_version may be used by a future version of this standard to indicate structurally different tables.

A version_number field (5-bit) represents a version number of the NST.

A current_next_indicator is a one-bit indicator, which when set to '1' shall indicate that the NRT Service Table sent is currently applicable. When the bit is set to '0', it shall indicate that the table sent is not yet applicable and will be the next table to become valid. This standard imposes no requirement that next tables (those with current_next_indicator set to '0') must be sent. An update to the currently applicable table shall be signaled by incrementing the version_number field.

A section_number field (8-bit) shall give the section number of this NRT Service table section. The section_number of the first section in an NRT Service table shall be '0x00'. The section_number shall be incremented by 1 with each additional section in the NRT Service table.

A last_section_number field (8-bit) shall give the number of the last section (the section with the highest section_number) of the NRT Service table of which this section is a part.

A num_NRT_services field (8-bit) specifies the number of NRT services in this NST section.

According to an embodiment of the present invention, an NST provides information for a plurality of fixed NRT services using a 'for' loop. Field information which is included in each fixed NRT service is explained as follows.

An NRT_service_id is a 16-bit unsigned integer number that shall uniquely identify this NRT Service within the scope of this NRT Broadcast. The NRT_service_id of a service shall not change throughout the life of the service. To avoid confusion, it is recommended that if a service is terminated, then the NRT_service_id for the service should not be used for another service until after a suitable interval of time has elapsed.

An NRT_service_status is a 2-bit enumerated field that shall identify the status of this NRT Service. The most significant bit shall indicate whether this NRT Service is active (when set to '1') or inactive (when set to '0') and the least significant bit shall indicate whether this NRT service is hidden (when set to '1') or not (when set to '0'). Hidden services are normally used for proprietary applications, and ordinary receiving devices should ignore them.

A SP_indicator is a 1-bit field that shall indicate, when set, that service protection is applied to at least one of the components needed to provide a meaningful presentation of this NRT Service.

A short_NRT_service_name_length is a three-bit unsigned integer that shall indicate the number of byte pairs in the short_NRT_service_name field. This value is shown as 'm' in the No. of Bits column for the short_NRT_service_name field. When there is no short name of this NRT service, the value of this field shall be '0'.

A short_NRT_service_name field is a short name of the NRT Service. When there is no short name of this NRT Service, this field shall be filled with NULLs ('0x00').

An NRT_service_category is a 6-bit enumerated type field that shall identify the type of service carried in this IP Service.

A num_components field (5-bit) specifies the number of IP stream components in this NRT Service.

An IP_version_flag is a 1-bit indicator, which when set to '0' shall indicate that source_IP_address, NRT_service_destination_IP_address, and component_destination_IP_address fields are IPv4 addresses. The value of 1 for this field is reserved for possible future indication that source_IP_address, NRT_service_destination_IP_address, and component_destination_IP_address fields are for IPv6.

A source_IP_address_flag is a 1-bit Boolean flag that shall indicate, when set, that a source IP address value for this NRT Service is present to indicate a source specific multicast.

An NRT_service_destination_IP_address_flag is a 1-bit Boolean flag that indicates, when set to '1', that an NRT_service_destination_IP_address value is present, to serve as the default IP address for the components of this NRT Service.

A source_IP_address field shall be present if the source_IP_address_flag is set to '1' and shall not be present if the source_IP_address_flag is set to '0'. If present, this field shall contain the source IP address of all the IP datagrams carrying the components of this NRT Service. The conditional use of the 128 bit-long address version of this field is to facilitate possible use of IPv6 in the future, although use of IPv6 is not currently defined.

An NRT_service_destination_IP_address field shall be present if the NRT_service_destination_IP_address_flag is set to '1' and shall not be present if the NRT_service_destination_IP_address_flag is set to '0'. If this NRT_service_destination_IP_address is not present, then the component_destination_IP_address field shall be present for each component in the num_components loop. The conditional use of the 128 bit-long address version of this field is to facilitate possible use of IPv6 in the future, although use of IPv6 is not currently defined.

According to an embodiment of the present invention, the NST provides information for a plurality of components using a 'for' loop.

An essential_component_indicator is a one-bit indicator which, when set to '1', shall indicate that this component is an essential component for the NRT Service. Otherwise, this field indicates that this component is an optional component.

A port_num_count field shall indicate the number of destination UDP ports associated with this UDP/IP stream component. The values of the destination UDP port numbers shall start from the component_destination_UDP_port_num field and shall be incremented by one.

A component_destination_IP_address_flag is a 1-bit Boolean flag that shall indicate, when set to '1', that the component_destination_IP_address is present for this component.

A component_destination_IP_address field shall be present if the component_destination_IP_address_flag is set to '1' and shall not be present if the component_destination_IP_address_flag is set to '0'. When this field is present, the destination address of the IP datagrams carrying this component of the NRT Service shall match the address in this field. When this field is not present, the destination address of the IP datagrams carrying this component shall match the address in the NRT_service_destination_IP_address field. The conditional use of the 128 bit-long address version of this field is to facilitate possible use of IPv6 in the future, although use of IPv6 is not currently defined.

A component_destination_UDP_port_num is a 16-bit unsigned integer field that represents the destination UDP port number for this UDP/IP stream component.

A num_component_level_descriptors is a 16-bit unsigned integer field, that represents the number of descriptors providing additional information for IP stream component, may be included.

A component_level_descriptors field includes one or more descriptors providing additional information for this IP stream component, may be included.

A num_NRT_service_level_descriptors field (4 bit) specifies the number of NRT service level descriptors for this service.

An NRT_service_level_descriptor( ) field includes zero or more descriptors providing additional information for this NRT Service, may be included. This detailed service type can include a portal service for providing web contents, Push VOD, A/V download or the like.

A num_virtual_channel_level_descriptors field (4-bit) specifies the number of virtual channel level descriptors for this virtual channel.

A virtual_channel_level_descriptor( ) includes zero or more descriptors providing additional information for the virtual channel which this NST describes, may be included.

An NRT service is transferred via FLUTE and access information in an NST table is connected to FLUTE session information as follows. A Source_IP_address becomes a source IP address of a same server that transmits all channels of FLUTE session. NRT_service_destination_IP_Address is signaled if there exists a destination IP address at a session level of this FLUTE session.

A component can be mapped to a channel within a FLUTE session and can signal a separate destination IP address per channel (this is different from an IP address signaled by a session unit) through component_destination_IP_address. Moreover, a destination port number is signaled through component_destination_UDP_port_num. And, it is able to additionally designate the number of destination ports starting from component_destination_UDP_port_num through port_num_count.

By designating ports to a plural number, it is able to construct a plurality of channels for one destination IP address. In this case, one component is able to designate a plurality of channels. Yet, it is preferable that a channel is identified via a destination IP address in general. In this case, one channel can be regarded as mapped to one component.

Content items/files for an NRT service are transferred through FLUTE and corresponding FLUTE session information is signaled using access information in an NST table. FIG. 13 is an exemplary diagram for a bit-stream syntax of NRT_component_descriptor( ) configured according to an embodiment of the present invention.

An NRT Component data means NRT content items or files delivered through a FLUTE session.

An NRT_component_descriptor( ) shall appear in the component descriptor loop of each component of each NRT service in the NST and all parameters in the descriptor shall correspond to the parameters in use for that component of the NRT service.

In the following description, each field information carried on NRT_component_descriptor shown in FIG. 13 is described.

A descriptor_length is a 8-bit unsigned integer that shall specify the length (in byes) immediately following this field up to the end of this descriptor.

A component_type field (7-bit) shall identify the encoding format of the component. The value may be any of the values assigned by IANA for the payload_type of an RTP/AVP stream [10], or it may be any of the values in Table 3 in this disclosure, or it may be a "dynamic value" within the range of 96 to 127. For components consisting of media carried via RTP, the value of this field shall match the value in the payload_type field in the RTP header of the IP stream carrying this component.

Note that additional values of the component_type field within the range of 43 to 71 can be defined in future versions of this standard. The NRT service stream transmitted through FLUTE protocol further requires parameters further to signal a FLUTE session as a Table 3. In the Table 3, '38' of component_type being defined for FLUTE component in the ATSC or '43' of component_type newly being defined for transmission NRT may be used.

TABLE 3

| component_type | Meaning |
| --- | --- |
| 0-34 | Assigned or reserved by IANA, except that 20-24, 27, and 29-30 are unassigned |
| 35 | H.264/AVC video stream component (assigned by ATSC use) |

TABLE 3-continued

| component_type | Meaning |
| --- | --- |
| 36 | SVC enhancement layer stream component (assigned by ATSC use) |
| 37 | HE AAC v2 audio stream component (assigned by ATSC use) |
| 38 | FLUTE file delivery session (assigned by ATSC use) |
| 39 | STKM stream component (assigned by ATSC use) |
| 40 | LTKM stream component (assigned by ATSC use) |
| 41 | OMA-RME DIMS stream component (assigned by ATSC use) |
| 42 | NTP timebase stream component (assigned by ATSC use) |
| 43-71 | [Unassigned by IANA and reserved by ATSC use] |
| 72-76 | Reserved by IANA |
| 77-95 | Unassigned by IANA |
| 96-127 | Designated by IANA for dynamic use |

A num_STKM_streams is an 8-bit unsigned integer field that shall identify the number of STKM streams associated with this component.

A STKM_stream_id is an 8-bit unsigned integer field that shall identify an STKM stream where keys to decrypt this protected component can be obtained, by reference to the STKM_stream_id in the component descriptor for the STKM stream.

An NRT_component_data (component_type) is explained as follow. The NRT_component_data( ) element provides the encoding parameters and/or other parameters necessary for rendering this component. The structure of the NRT_component_data is determined by the value of component_type field.

The FDT of the FLUTE sessions which is used to deliver the items lists all the content items and gives their sizes, data types, and other information relevant to the acquisition of the items.

Therefore, the present invention obtains information for accessing a FLUTE session carrying a corresponding content using NST to receive a content selected from a service guide constructed using NCT. And, the present invention intends to map information on a content item of NCT to information on a file transferred via a corresponding FLUTE session. In this case, identification of a service including the selected content item can be done via the NRT_service_id of the aforesaid NST. Yet, as mentioned in the foregoing description of FIG. 3, in order to know one or more content items included in each NRT service and files belonging to the content items in further detail, mapping to a content identifier within FDT information on a FLUTE session is necessary rather than information on the FLUTE session carrying the corresponding content item(s).

The NRT service is transferred via FLUTE and access information in an NST is connected to FLUTE session information as follows. A Source_IP_address becomes a source IP address of a same server that transmits all channels of FLUTE session. NRT_service_destination_IP_Address is signaled if there exists a destination IP address at a session level of this FLUTE session.

A component can be mapped to a channel within a FLUTE session and can signal a separate destination IP address per channel (this is different from an IP address signaled by a session unit) through component_destination_IP_address. Moreover, a destination port number is signaled through component_destination_UDP_port_num. And, it is able to additionally designate the number of destination ports starting from component_destination_UDP_port_num through port_num_count.

By designating ports to plural number, it is able to construct a plurality of channels for one destination IP address. In this case, one component is able to designate a plurality of channels. Yet, it is recommended that a channel is identified via a destination IP address in general. In this case, one channel can be regarded as mapped to one component.

In order to signal an additional attribute of a component constructing a session, it is able to use component_attribute_byte. Additional parameters required for signaling a FLUTE session can be signaled through this field.

In order to signal the FLUTE session, parameters are necessary. Such parameters include necessary parameters and parameters which are selectively necessary in association with the FLUTE session. First, the necessary parameters include a "source IP address" parameter, a "number of channels in the session" parameter, a "destination IP address and port number for each channel in the session" parameter, a "Transport Session Identifier (TSI) of the session" parameter and a "start time and end time of the session" parameter, and the parameters which are selectively necessary in association with the FLUTE session include an "FEC object transmission information" parameter, a "some information that tells a receiver in the first place, that the session contains files that are of interest", and a "bandwidth specification" parameter.

The "number of channels in the session" parameter may be explicitly provided or may be obtained by summing the number of streams configuring the session. Among the parameters, the "start time and end time of the session" parameter, the "source IP address" parameter, the "destination IP address and port number for each channel in the session" parameter, the "Transport Session Identifier (TSI) of the session" parameter and the "number of channels in the session" parameter may be signaled through NST and component_descriptor.

FIG. 14 is an exemplary diagram for a bit-stream syntax of an FLUTE component descriptor which is one of the NRT_FLUTE_component_data configured according to an embodiment of the present invention.

A single NRT service may contain multiple FLUTE sessions. Each session may be signaled using one or more FLUTE component descriptors, depending on the IP addresses and ports used for the sessions.

In the following description, each field of NRT_FLUTE_component_data( ) is explained in detail.

A TSI is a 16-bit unsigned integer field, which shall be the Transport Session Identifier (TSI) of the FLUTE session.

A session_start_time indicates the time at which the FLUTE session starts. If the value of this field is set to all zero, then it shall be interpreted to mean that the session has already started.

A session_end_time indicates the time at which the FLUTE session ends. If the value of this field is set to all zero, then it shall be interpreted to mean that the session continues indefinitely.

A tias_bandwidth_indicator is a 1-bit field that flags the inclusion of Transport Independent Application Specific (TIAS) bandwidth information. This bit shall be set to '1' to indicate the TIAS bandwidth field is present, and it shall be set to '0' to indicate the TIAS bandwidth field is absent.

An as_bandwidth_indicator is a 1-bit field that flags the inclusion of Application Specific (AS) bandwidth information. This bit shall be set to '1' to indicate the AS bandwidth field is present, and it shall be set to '0' to indicate the AS bandwidth field is absent.

A FEC_OTI_indicator is a 1-bit indicator that indicates whether FEC Object Transmission Information is provided.

A tias_bandwidth field has a value. This value shall be one one-thousandth of the TIAS maximum bandwidth, rounded up to the next highest integer if necessary.

An as_bandwidth has a value. This value shall be the AS maximum bandwidth.

A FEC_encoding_id field identifies a FEC encoding ID used in this FLUTE session.

A FEC_instance_id field identifies a FEC instance ID used in this FLUTE session.

By signaling the above described parameters, it is able to provide all information mandatory to receive a FLUTE session. And, it is able to use a method of receiving FDT via this session, obtaining information on all files carried on a FLUTE session via the received FDT and receiving theses files.

This FLUTE component descriptor can be delivered via component_level_descriptor loop of NST. In case that there is a plurality of FLUTE channels, such parameters at a session level as TSI, session_start_time, session_end_time and the like should be signaled only once. Hence, one of components of several channels can transmit a FLUTE component descriptor via Component_level_descriptor loop.

In the following description, NCT is explained.

FIG. 15 is a diagram for a bit-stream syntax of an Non-Real-Time Content Table (NCT) section configured according to an embodiment of the present invention.

In the following description, explained is NCT associated with signaling/announcement of an NRT content.

In FIG. 15, an NCT is newly defined to signal NRT content. This is just one of various embodiments and other methods are considerable as well. Via NCT, it is able to signal an NRT content. Information of each field constructing an NCT section is explained in detail as follows.

A table_id is an 8-bit field which shall be set to 0xTBD to identify this table section as belonging to the NRT Content Table (NCT).

A service_id field is a 16-bit field which shall specify the service_id associated with the NRT service offering content items described in this section.

An NCT_version_number is a 5-bit field which shall indicate the version number of this NCT instance, where NCT instance is defined as the set of one or more NRT_content_table_section( ) having common values for service_id, current_next_indicator, protocol_version, and time_span_start. The version number shall be incremented by 1 modulo 32 when any field in the NCT instance changes.

A current_next_indicator is a 1-bit indicator which shall always be set to '1' for NCT sections; the NCT sent is always currently applicable.

A protocol_version is an 8-bit unsigned integer field which shall be set to zero. The function of protocol_version is to allow, in the future, this table type to carry parameters that may be structured differently than those defined in the current protocol. At present, the only valid value for protocol_version is zero. Non-zero values of protocol_version may be used by a future version of this standard to indicate structurally different tables.

A time_span_start is a 32-bit unsigned integer which shall represent the start of the time span covered by this instance of the NCT, expressed as the number of GPS seconds since 00:00:00 UTC, January 6, 1980. The time of day of time_span_start shall be aligned to minute 00 of the hour. The value zero for time_span_start shall indicate the time period covered by his NCT instance began in the indefinite past. The value of time_span shall be the same for each section of a multi-sectioned NCT instance. The values of time_span_start and time_span_length shall be set such that the specified time span does not overlap with any other NCT instance in this IP subnet.

A time_span_length is a 11-bit unsigned integer field in the range 0 to 1440 which shall indicate the number of minutes, starting at the time indicated by time_span_start, covered by this instance of the NCT. Once established, the value of time_span_length for a given value of time_span_start shall not change. A value of time_span_length of zero shall mean this NCT instance covers all time starting at time_span_start into the indefinite future. If the value of time_span_start is zero, time_span_length shall have no meaning. The value of time_span_length shall be the same for each section of a multi-sectioned NCT instance. The values of time_span_start and time_span length shall be set such that the specified time span does not overlap with any other NCT instance in this IP subnet.

A num_items_in_section is a 8-bit unsigned integer field which shall indicate the number of content items described in this NCT section.

A content_linkage is a 16-bit unsigned integer field in the range 0x0001 to 0xFFFF which shall specify the identification number of the content described. Value 0x0000 shall not be used. The content_linkage performs two linkage functions: it links metadata in the NCT to one or more files in the FLUTE FDT associated with this NRT service; it also forms the TF_id (identifier for Text Fragment in Text Fragment Table). The value of the content_linkage field shall correspond to either the value of one of the FDT-Content-Linkage elements or the value of one of the File-Content-Linkage elements in the FLUTE FDT for each file associated with the content item. For a particular virtual channel, the value of content_linkage shall uniquely identify each of the items of content scheduled to be available for download.

An updates_available is a Boolean flag which shall specify, when set to '1,' that the referenced content item(s) will be updated periodically: for content items delivered in FLUTE sessions, receiving devices are expected to monitor for changes the TOI associated with each file associated with the given value of content_linkage. When the updates_available flag is set to '0', updates are not expected to be provided for the associated content item(s), and receivers are not expected to look for them.

A TF_available is a Boolean flag which shall specify, when set to '1' that a Text Fragment is present in a Text Fragment Table in the service signaling channel. When the flag is set to '0,' no Text Fragment is included in the service signaling channel for this content item.

A low_latency is a Boolean flag which shall specify, when set to '1,' that the content is available within the current digital transport with a low enough latency that its retrieval should be attempted while the user waits. When the flag is set to '0,' retrieval latency is longer and the user interface should suggest to the user to return later for viewing.

A content_length_included is a Boolean flag which shall indicate, when set to '1,' that the content_length field is present in this iteration of the "for" loop. Setting this flag to '0' shall indicate the content_length field is not present in this iteration of the "for" loop.

A playback_length_in_seconds is a 20-bit unsigned integer quantity which shall specify the duration of playback of the content, in seconds. For content consisting only of text and/or still images, the value zero shall be used. For content that includes audio or audio/video content, the playback_length_in_seconds shall indicate the playback length of the audio or audio/video content.

A content_length, when present, this 40-bit unsigned integer quantity shall represent the total size in bytes of the content item or items. This item is used by the receiving device to determine if enough memory is available to store it before downloading is attempted. The content_length field shall be present when content_length_included is set to '1' and absent otherwise. When content_length is not present in a given iteration of the "for" loop, the length of the content described in that iteration shall be the value specified in the default_content_length field in the NRT_service_info_descriptor( ), if present in the SMT.

A playback_delay_included is a Boolean flag which shall indicate, when set to '1,' that the playback_delay field is present in this iteration of the "for" loop. Setting this flag to '0' shall indicate the playback_delay field is not present in this iteration of the "for" loop.

A duration is a 12-bit unsigned integer field in the range 1 to 2880 which shall specify the expected cycle time, in minutes, of the carousel containing the referenced content item. A receiver is expected to use the duration parameter to determine the amount of time needed to capture the referenced content.

A playback_delay is a 20-bit unsigned integer count of the number of seconds following reception of the first byte of the associated content the receiver shall wait before playback may start, while buffering the incoming stream. A value of zero shall indicate playback may commence immediately. When playback_delay is not provided, the receiver is expected to retrieve the complete file or files set prior to playback.

A expiration_included is a Boolean flag which shall indicate, when set to '1,' that the expiration field is present in this iteration of the "for" loop. Setting this flag to '0' shall indicate the expiration field is not present in this iteration of the "for" loop.

A expiration is a 32-bit unsigned integer which shall represent the expiration time of the content, expressed as the number of GPS seconds since 00:00:00 UTC, January 6, 1980. Following expiration, the content should be deleted from memory. If an expiration time is not specified, receivers are expected to use methods of their own choosing to manage memory resources.

A content_name_length is a 8-bit unsigned integer field which shall specify the length (in bytes) of the content_name_text( ).

A content_name_text( ) field which shall specify the content item title in the format of a multiple string structure.

A content_descriptors_length is a 12-bit unsigned integer field which shall indicate the total length (in bytes) of the content item descriptor list that follows.

A content_descriptor( ) is a one or more descriptors which may be included in the NCT in an iteration of the content item "for" loop. Table 4 lists some content-level descriptors usable in the NCT. The presence of some descriptors is mandatory. Required content-level descriptors shall be as indicated with the word "Required" in Table 4.

TABLE 4

| Descriptor Name | Descriptor Tag | Reference and Description |
|---|---|---|
| Time slot descriptor | TBD | Sec. 9.8. Provides the time(s) the associated content is scheduled to be made available in the digital transport. Required. |

TABLE 4-continued

| Descriptor Name | Descriptor Tag | Reference and Description |
|---|---|---|
| Media type descriptor | TBD | Sec. 9.5. Lists the Media types of those formats and encodings for which receiver support is essential for a meaningful presentation of the service. |
| Internet location descriptor | TBD | Sec. 9.9. Provides optional URLs for Internet-based access to the content. |
| ISO-639 language descriptor | 0x0A | ISO/IEC 13818-1 [4] Sec. 2.6.18. If present, indicates the language of audio and/or textual components of the service. |
| Content labeling descriptor | 0x24 | A/57 [6] and ISO/IEC 13818-1 [4] Sec. 2.6.56. Associates the content with content labeling metadata. Use of ISAN is strongly recommended for content containing audio/video components. |
| MPEG-2 AAC audio descriptor | 0x2B | ISO/IEC 13818-1 [4] Sec. 2.6.68. Provides information pertaining to the audio portion of the content. |
| Caption service descriptor | 0x86 | A/65 [1] Sec. 6.9.2. Provides caption service information pertinent to the content object(s). |
| Content advisory descriptor | 0x87 | A/65 [1] Sec. 6.9.3. Provides content advisory information pertinent to the content object(s). |
| Genre descriptor | 0xAB | A/65 [1] Sec. 6.9.13. Indicates the Genre category associated with the content object(s). |
| ATSC private information descriptor | 0xAD | A/53 Part 3 [5] Sec. 6.8.4. Usable for private information associated with the content object(s). |
| M/H component descriptor | 0xBC | A/153 Part 3 [3] Sec. 7.8.1 The following component types are applicable for NRT-IT use: |

| component type | Meaning |
|---|---|
| 35 | H.264/AVC video stream |
| 36 | SVC enhancement layer stream |
| 37 | HE AAC v2 audio stream |
| 39 | STKM stream component |
| 40 | LTKM stream component |

A descriptors_length is a 10-bit unsigned integer number that indicates the number of bytes of descriptors (if any) to follow.

A descriptor( ) is a data structure in standard descriptor format (tag, length, data) that provides information about the NRT content described in this NRT_content_table_section( ). No descriptors of this type are currently defined.

Figure 16:
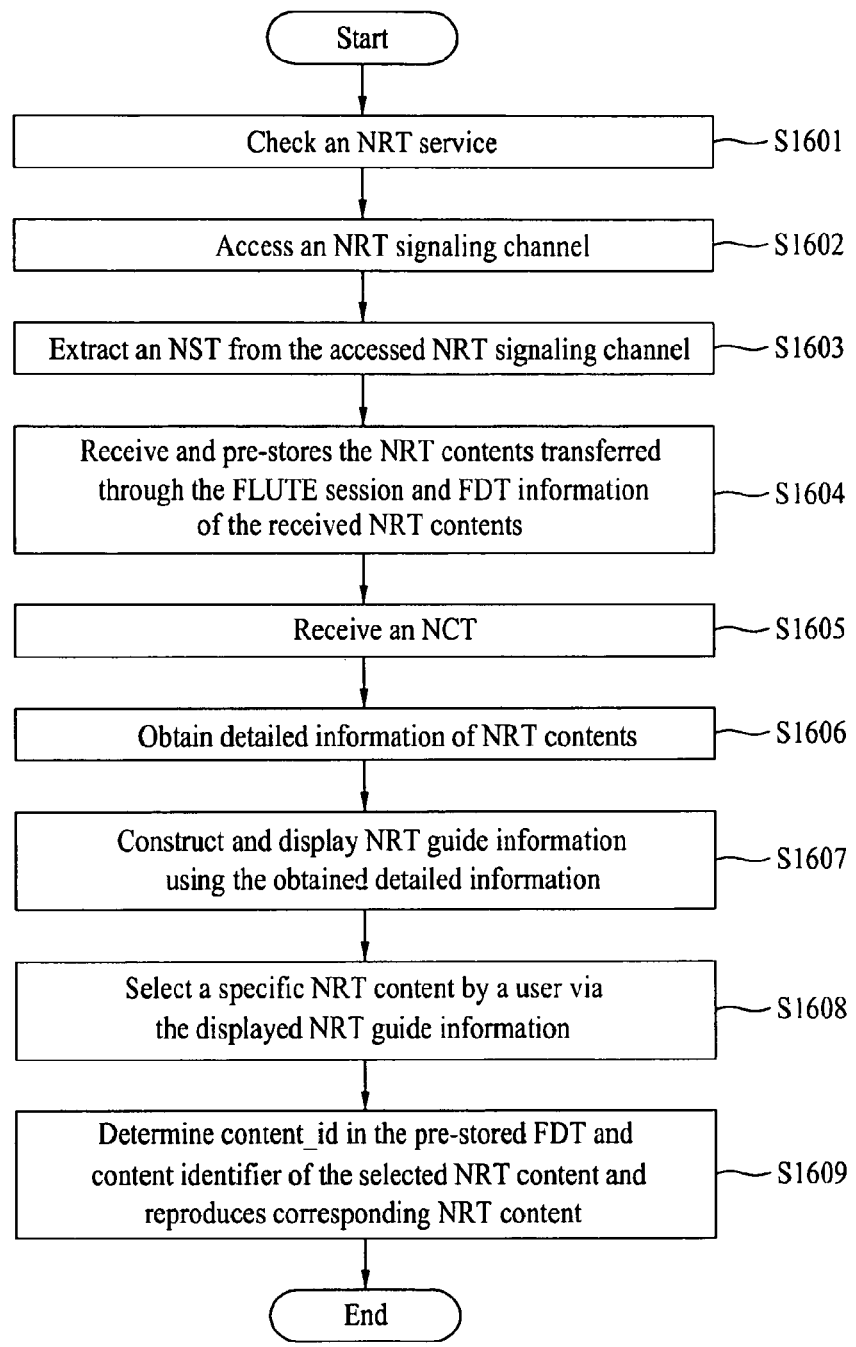
FIG. 16 is a flowchart for a method of configuring NRT guide information and providing contents according to another embodiment of the present invention.

FIG. 16 is a flowchart for a method of configuring NRT guide information and providing contents according to another embodiment of the present invention.

Referring to FIG. 16, a receiver checks an NRT service carried on a virtual channel [S1601] using PSI/PSIP (PMT, DST and VCT) information and then accesses an NRT signaling channel transmitted via an IP layer [S1602].

Subsequently, NST is extracted from the accessed NRT signaling channel [S1603].

The receiver parses the extracted NST, connects the NRT service, and receives and pre-stores the NRT contents transferred through the FLUTE session and FDT information of the received NRT contents [S1604].

An NCT having NRT_service_id is extracted from the NRT signaling channel.

NCT is received [S1605]. The receiver obtains detailed information of NRT contents using each field in the received NCT [S1606]. The NRT guide information is constructed using the detailed information obtained in the step [S1606] and is then displayed [S1607].

If a signal indicating that a specific NRT content has been selected by a user via the displayed NRT guide information is received [S1608], the receiver identifies content identifier of the selected NRT content in the NRT guide information and detects a content_id matched with the content identifier in the pre-stored FDT. And the receiver reproduces corresponding NRT content [S1609]. The embodiment of FIG. 16 shows that firstly a receiver accesses a FLUTE session and stores (or downloads) content items/files in the storage. After storing the content items/files in the storage, the receiver displays the NRT guide information if a user wants to view the NRT guide information. When a user selects a content item through the displayed NRT guide information, the receiver displays the selected content item by extracting the selected content item from the storage. This embodiment is performed if a receiver has a sufficient storage space and some users want to receive all NRT content items/files.

When matching operation between the content identifier of the selected NRT content in the NRT guide information and content_id of the FDT is performed, a NRT service which contains the NRT content (NRT content items/files) has to be identified. The NRT service is identified using a service identifier field of the NCT and the NST. So if some content is selected in the NRT service guide information, a receiver identifies content identifier through the NCT and then detects a service identifier through the NCT and NST. So the receiver knows which service including the selected content is provided and displayed.

Figure 17:
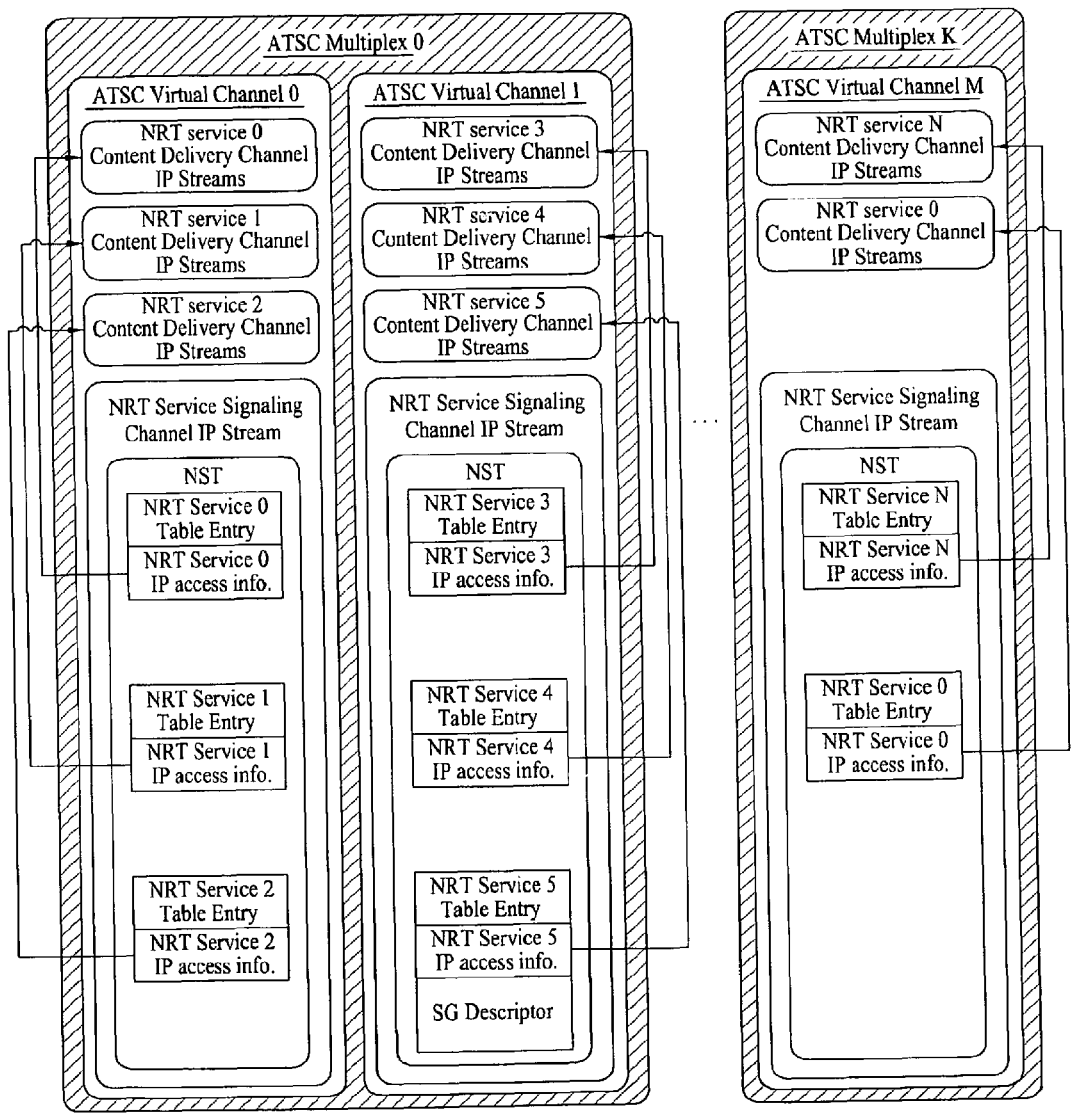
FIG. 17 is a diagram for an NRT service signaling structure configured according to another embodiment of the present invention.

A signaling structure of the above described NRT service is shown in FIG. 17.

FIG. 17 is a diagram for an NRT service signaling structure configured according to another embodiment of the present invention.

Referring to FIG. 17, each ATSC virtual channel includes NRT service signaling channel to be transferred as IP stream. At this time, the NST and NCT are transferred via the NRT service signaling channel. The NST includes a table entry transferring corresponding NRT service. For instance, three NRT channels (NRT channels 0, 1 and 2) are provided on ATSC Virtual Channel 0. In case of ATSC Virtual Channel 1, NRT channels 3, 4 and 5 are provided. In particular, one virtual channel includes one or more NRT channels. And, an NST is able to identify each of the NRT channels. Each of the NRT channels carries an IP stream.

FIG. 18 is an exemplary diagram to explain a FDT schema for detecting a file having a content_id according to an embodiment of the present invention, and FIG. 19 is an exemplary diagram to explain a FDT schema according to another embodiment of the present invention, which represents a FDT instance level entry file designating method. An NRT content has a plurality files. But there is no indication in each file. It is difficult to find files belonging to the NRT content. So FIG. 18 and FIG. 19 show that inserting content_id to a FDT for each files.

In the following description, a FDT instance level refers to a level containing a portion, in which the common attribute is defined, if the common attribute of all files declared in the FDT needs to be defined. A FDT file level is used to indicate a level containing definition of the individual attribute of each of the files.

The receiver identifies whether a transferred service via corresponding channel is an NRT service based upon the PSI/PSIP, NST and NCT. Also, the receiver identifies content items and files of corresponding NRT service.

As mentioned in the foregoing description, the receiver may identify files and content items in the fixed NRT service. However, the receiver cannot be matched with the files to the content items because of not having the information on the files in the content items. Accordingly, the receiver cannot process the received fixed NRT service.

Therefore, the present invention can provide a method for identifying which files are associated with the content items. In other words, the method will indicate what files exist in the content items. In this case, the receiver can properly process the received fixed NRT services. In this disclosure, the method may be specified based on the FDT information in the FLUTE session transmitting fixed NRT services. For instance, each file constructing the content items is identified based on content-location and TOI field specified in the FLUTE session. A content_id in the FDT is matched with a content identifier of a content in the NCT.

Referring to FIGS. 18 and 19, a part indicated by #1 declares content_id at FDT-Instance level. In this case, the declared content_id is given to all files declared within the corresponding FDT-Instance. By newly giving content_id at a file level, it is able to override this information. Alternatively, if a specific file belongs to another content item instead of a content item defined at the FDT-Instance level, this can be announced by giving a file level content_id that will be explained in the following description. In the present embodiment, content_id is represented using 32 bits.

A part indicated by #2 declares content_id at a file level. In this case, unlike #1 where it includes all files, #2 limits to files associated with content_id. If a file included within FDT Instance belongs to a different content item, it is signaled that each file belongs to a prescribed content item using this method. At the file level, it is possible to know where the file belongs within the content items and what the entry is on every file of the content.

A part indicated by #3 is a method for informing each file whether the corresponding file is an entry file. In other words, it defines the content-id of the entry file. In particular, a file, which is played back in the first place, or a file corresponding to a root file, which should be executed first to access a content item, among several files constructing a content item, is called an entry file. This part indicates a method of announcing this information. If it is omitted as 'false', a basic value means that a corresponding file is not an entry file. "Entry" refers to the header of a file that needs to process in order to execute the file. For example, "index.html" can be an "entry." Therefore, an entry file will be set to "true" and other files will be set to "false." Through the entry file, redundancy in sending the same files can be effectively controlled. Once a file has been downloaded, the same file does not need to be downloaded in a different or a separate instance because the entry file will indicate the file of the content for other references.

By signaling a presence or non-presence of an entry according to a group belonging at a file level, a specific file plays a role as an entry in a specific group but may fail to play the role in another group.

As a method of announcing a presence or non-presence of an entry file in case of assigning content_id at FDT-instance level, the following two kinds of methods can be taken into consideration.

1) Method of assigning File-level content_id to a file corresponding to an entry file in addition and setting its entry attribute to 'true'—in this case, it is disadvantageous in that content identifier is overlapped at FDT-Instance level and file level. Yet, this case can provide the most flexible structure. In other words, it is possible to assign content_id to one of the File-level and FDT-instance level. But if the different content_id is assigned to both File-level and FDT-instance level, a content_id of the File-level has a priority.

2) It is able to consider a method of directly referencing files playing a role as an entry file in the content identifier definition at FDT-instance level like another embodiment of the FDT scheme shown in FIG. 19. For this, in the embodiment shown in FIG. 19, FDT-Content-ID-Type is separately defined for FDT-instance level content identifier. This is extended to include a content location of an entry file as indicated by #2. In case of #2, the entry level is defined by its content-id. For example, it defines what the entry file on each content-id is.

In case of this method, it may be disadvantageous in that a content location is repeatedly signaled. But, it becomes advantageous in that entry file configuring information can be directly obtained per content item.

Figure 20:
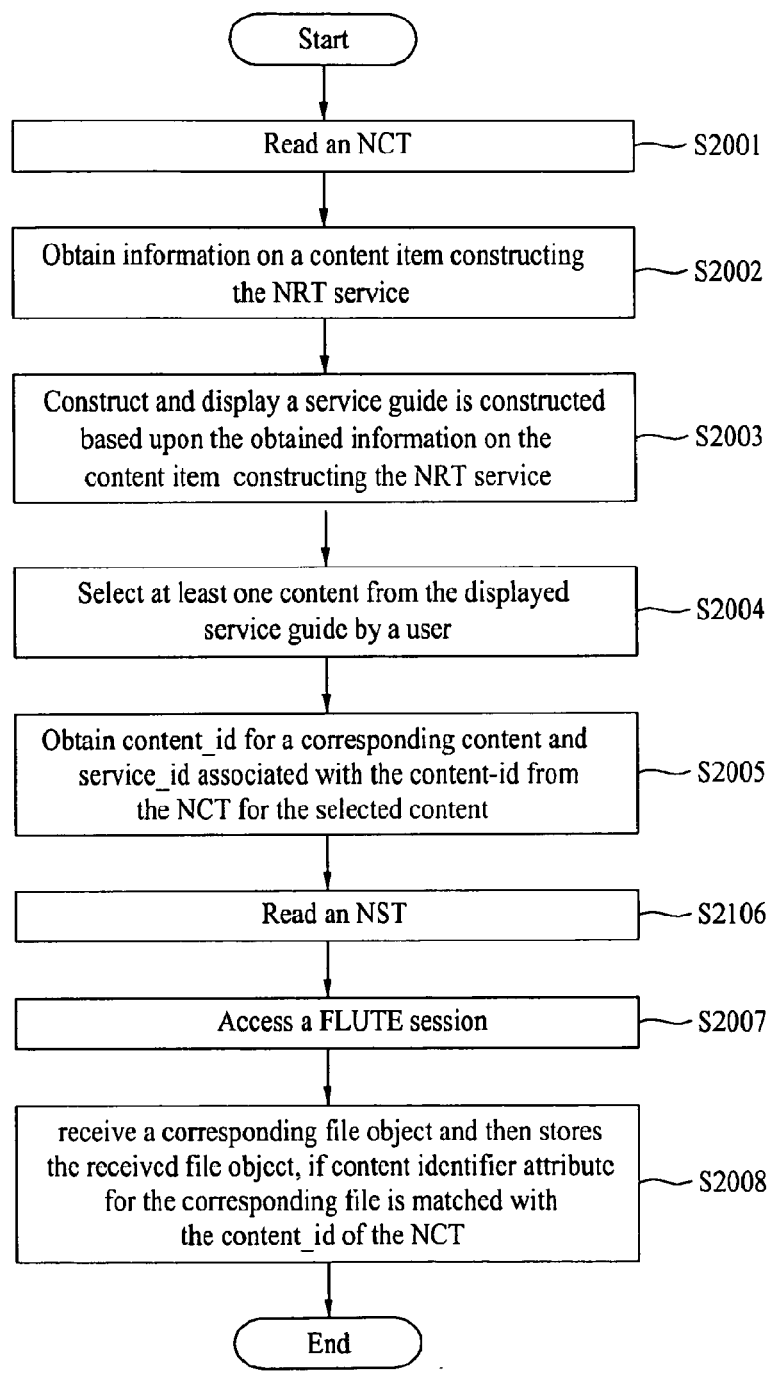
FIG. 20 is a flowchart to explain a process for processing an NRT service in a receiver according to an embodiment of the present invention.

FIG. 20 is a flowchart to explain a process for processing an NRT service in a receiver according to a different embodiment of the present invention.

Referring to FIG. 20, a receiver reads an NCT for signaling or announcing an NRT service [S2001]. The receiver obtains information on a content item constructing the NRT service via the read NCT [S2002]. In this case, the information on a content item, for example, may be displayed an NRT guide information which is constructed based on the content_id, content_name_text( ) and so on.

An NRT guide information is constructed based upon the obtained information on the content item constructing the NRT service and is then displayed [S2003].

If at least one content is selected from the displayed NRT guide information by a user or the like [S2004], content_identifier for a corresponding content and service identifier associated with the content_identifier are obtained from the NCT for the selected content [S2005].

Using the service identifier of the NCT, the receiver reads an NST including the same service identifier and then detects a FLUTE session information from the NST to receive the selected content [S2006]. Then the receiver accesses a FLUTE session for carrying a file constructing the corresponding content item by finding service_id that matches the service_id obtained in the step S2004 [S2007].

The receiver reads a FDT in the corresponding FLUTE session and then determined whether or not content identifier of the NCT is identical to the content_id in the FDT.

If content_id of the FDT for the corresponding file is matched with the content_identifier of the NCT, the receiver receives a corresponding file and then stores the received file [S2008].

In this case, the receiver can be aware of a file list belonging to each content-item by parsing FDT instances within a session. The receiver is also able to recognize which file in the file list plays a role as an entry. In particular, the receiver is able to know that each file belongs to a prescribed content item using the FDT instance. The receiver is able to arrange a file list by a content item unit separately and then stores the arranged list, if necessary.

When a specific content item starts to be used by a selection made by a user or the like, content consumption is initiated using the content item configuration information obtained in the above process and the entry information included in the content item configuration information.

In this case, in constructing a NRT guide information using the NCT, it is able to construct a NRT guide information using both NCT and NST by parsing them together instead of parsing NCT and NST in order or vice versa. For instance, after descriptors for NST and associated NRT service have been parsed, application type and other requirement information are read by each NRT service unit. Moreover, application (service category) information on each service is displayed on an NRT guide information screen and detailed information is displayed using other fields of NRT_service_info_descriptor (displaying a size of a corresponding service using storage_requirement field, displaying audio and video codec information using audio_codec_type field and video_codec_type field, etc.). It means that by parsing both NST and NCT the receiver can display a lot of information on the NRT guide information.

Referring to FIG. 16, the NRT service may be provided by a PUSH method or through an NRT service dedicated channel according to an embodiment of the present invention. At this time, the receiver receives the content items within the received NRT service through the accessed FLUTE session and then stores. And, the receiver reproduces wanted content item within the stored content items based on the NCT. Herein, the wanted content item is selected by a user through the NRT guide information using the NCT.

However, referring to FIG. 20, the receiver parses an NCT and then provides an NRT guide information to a user based on the parsed NCT. And, if the user selects a specific content item, the receiver parses an NST. Then the receiver accesses an FLUTE session transmitting the NRT service including the selected content item. The receiver receives the NRT service including the selected content item and then stores the content item. Finally, the receiver can reproduce the stored content item. So the selected content item is received and stored.

In the above-mentioned, the method of FIG. 16 differs from the method of FIG. 20. The method of FIG. 16 can quickly reproduce the content item by pre-storing all content items of the NRT service. On the contrary, the receiver can only store the wanted content item according to the method of FIG. 20. Herein, the receiver can provide an NRT guide information and then only receive the content item selected by the user.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of receiving a non-real time (NRT) service, the method comprising:
   receiving in a reception unit an MPEG-2 transport stream (TS), wherein the MPEG-2 TS includes internet protocol (IP) datagrams which carry NRT content items/files for the NRT service, an NRT content table, the NRT content table containing information describing content items, and an NRT service table containing service-level attributes for the NRT service;
   parsing in a processor the NRT content items/files, the NRT content table and the NRT service table; and
   wherein the NRT content items/files, the NRT content table and the NRT service table are encapsulated based on a User Datagram Protocol/Internet Protocol (UDP/IP) method,
   wherein the NRT content items/files is further encapsulated based on a File Delivery over Unidirectional Transport (FLUTE) method and an Asynchronous Layered Coding/Layered Coding Transport (ALC/LCT) method,
   wherein the processor parses first information linking between the NRT content table and the NRT service table, second information identifying the content items/files and being used to map one or more files carried on the FLUTE file delivery session for the NRT service to content items from the NRT content table, third information identifying the NRT service from the NRT service table, the NRT service table being linked to the NRT content table through the third information of the NRT service table, and fourth information indicating that a category of a service is an NRT service from the NRT service table, wherein the NRT content table and the NRT service table are received via a service signaling channel (SSC) with a specific IP address and UDP port number, and wherein the second information is unique within a single content item for the NRT service.

* * * * *